United States Patent
Chaganti et al.

(10) Patent No.: US 11,158,352 B1
(45) Date of Patent: Oct. 26, 2021

(54) METHOD AND SYSTEM FOR INDEXING VIDEO DATA USING A DATA PROCESSING UNIT

(71) Applicant: Dell Products L.P., Hopkinton, MA (US)

(72) Inventors: Ravikanth Chaganti, Bangalore (IN); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/080,482

(22) Filed: Oct. 26, 2020

(51) Int. Cl.
| | |
|---|---|
| *H04N 9/80* | (2006.01) |
| *G11B 27/10* | (2006.01) |
| *G11B 27/22* | (2006.01) |
| *H04N 5/77* | (2006.01) |
| *H04N 5/92* | (2006.01) |
| *G06K 9/00* | (2006.01) |

(52) U.S. Cl.
CPC .......... *G11B 27/102* (2013.01); *G11B 27/22* (2013.01); *H04N 5/77* (2013.01); *H04N 5/9201* (2013.01); *G06K 9/00744* (2013.01); *G06K 9/00765* (2013.01)

(58) Field of Classification Search
CPC ........ G11B 27/102; G11B 27/22; H04N 5/77; H04N 5/9201; G06K 9/00744; G06K 9/00765
USPC ................ 386/241, 248, 278, 326, 239, 243
See application file for complete search history.

(56) References Cited

U.S. PATENT DOCUMENTS

| | | |
|---|---|---|
| 2012/0198335 A1 | 8/2012 | Huang |
| 2013/0218885 A1* | 8/2013 | Satyanarayanan .... G06F 16/335 707/728 |
| 2013/0238572 A1 | 9/2013 | Prahlad et al. |
| 2019/0278910 A1* | 9/2019 | Zhang .................. G06F 21/606 |
| 2020/0057699 A1 | 2/2020 | Juniwal et al. |

* cited by examiner

*Primary Examiner* — Robert Chevalier
(74) *Attorney, Agent, or Firm* — Chamberlain, Hrdlicka, White, Williams & Aughtry

(57) ABSTRACT

A method for processing video data is performed by a data processing unit (DPU). The method includes obtaining, by the DPU of an edge device, video data; processing the video data to obtain video data chunks and indexing attributes; generating indexing metadata based on the video data chunks and the indexing attributes; processing the video data chunks and indexing attributes to generate contextual attributes; generating contextual metadata based on the contextual attributes and the video data chunks; associating the indexing metadata and the contextual metadata with the video data chunks; and storing the indexing metadata, contextual metadata, and the video data chunks in storage.

20 Claims, 23 Drawing Sheets

METHOD AND SYSTEM FOR INDEXING VIDEO DATA USING A DATA PROCESSING UNIT

BACKGROUND

Devices may obtain data from other devices and generate information based on the obtained data. The generated information may be associated with the obtained data. The obtained data and generated information may be stored in storage devices. To obtain data and store data, devices may be able to communicate with other devices. The communications between devices may be through any means. The devices may be connected via any combination of wireless and non-wireless connections.

SUMMARY

In general, in one aspect, the invention relates to a method performed to process video data. The method includes obtaining, by a data processing unit (DPU) of an edge device, video data; processing the video data to obtain video data chunks and indexing attributes; generating indexing metadata based on the video data chunks and the indexing attributes; processing the video data chunks and indexing attributes to generate contextual attributes; generating contextual metadata based on the contextual attributes and the video data chunks; associating the indexing metadata and the contextual metadata with the video data chunks; and storing the indexing metadata, contextual metadata, and the video data chunks in storage.

In general, in one aspect, the invention relates to a system that is used to process video data. The system includes a backup storage operatively connected to an edge device, a video camera operatively connected to the edge device and configured to generate video data, the edge device, which includes a data processing unit (DPU). The DPU is configured to perform a method. The method includes obtaining, by the DPU, video data; processing the video data to obtain video data chunks and indexing attributes; generating indexing metadata based on the video data chunks and the indexing attributes; processing the video data chunks and indexing attributes to generate contextual attributes; generating contextual metadata based on the contextual attributes and the video data chunks; associating the indexing metadata and the contextual metadata with the video data chunks; and storing the indexing metadata, contextual metadata, and the video data chunks in storage.

In general, in one aspect, the invention relates to a non-transitory computer readable medium which includes computer readable program code, which when executed by a computer processor enables the computer processor to perform a method for processing video data. The method includes obtaining, by a DPU of an edge device, video data; processing the video data to obtain video data chunks and indexing attributes; generating indexing metadata based on the video data chunks and the indexing attributes; processing the video data chunks and indexing attributes to generate contextual attributes; generating contextual metadata based on the contextual attributes and the video data chunks; associating the indexing metadata and the contextual metadata with the video data chunks; and storing the indexing metadata, contextual metadata, and the video data chunks in storage.

DETAILED DESCRIPTION

Figure 1A:
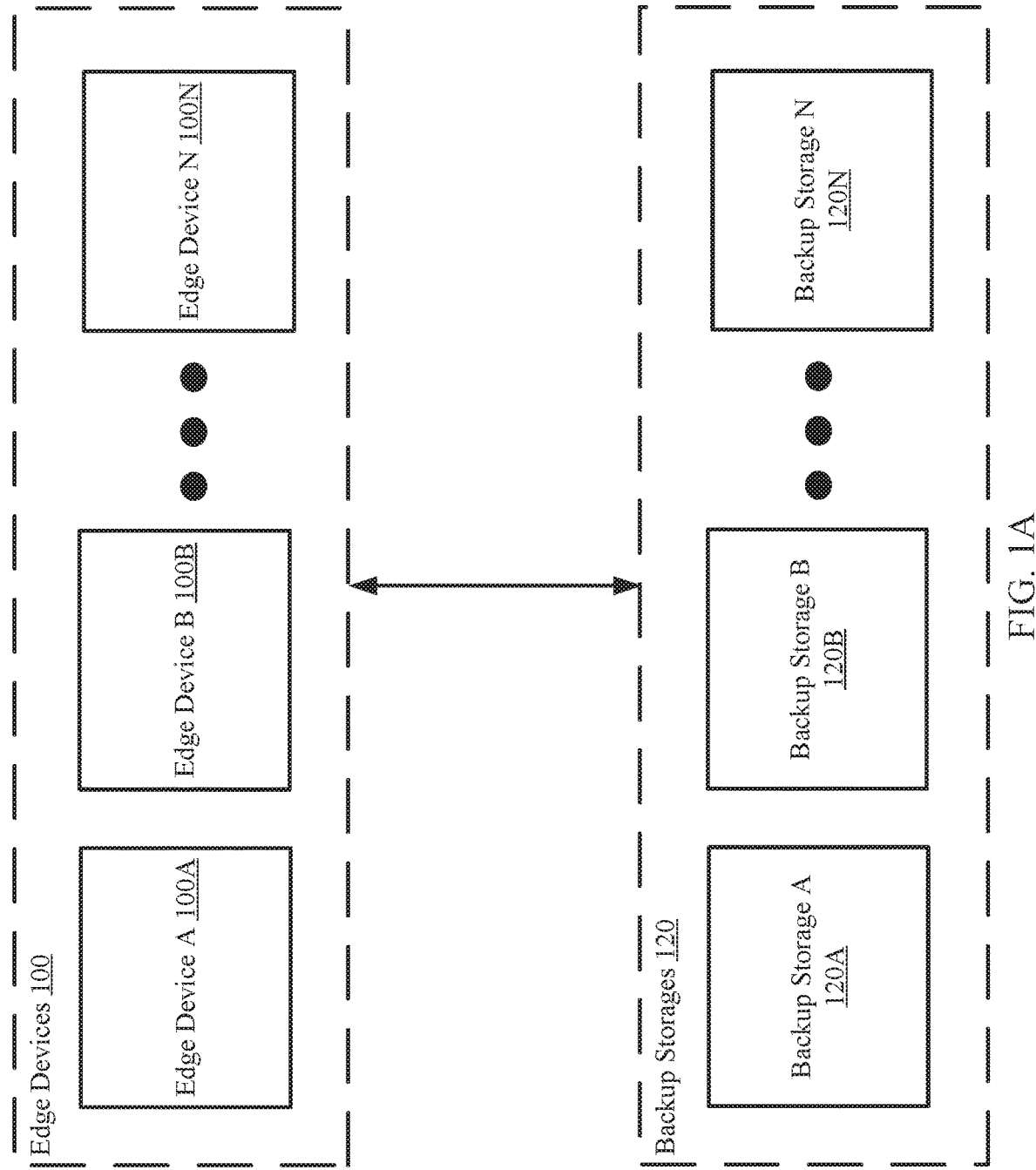
FIG. 1A shows a diagram of a system in accordance with one or more embodiments of the invention.

Specific embodiments of the invention will now be described in detail with reference to the accompanying figures. Like elements in the various figures are denoted by like reference numerals for consistency. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for performing an indexing and contextual operation in accordance with one or more embodiments of the invention. Indexing operations may result in the generation of indexing metadata. The indexing metadata may enable efficient searching of relevant video data chunks stored in system. A contextual operation may result in the generation of contextual metadata, which may further optimize searching for relevant data chunks stored in the system.

Turning to the figures, FIG. 1A shows a diagram of a system in accordance with one or more embodiments of the invention. The system may include edge devices (100) and backup storages (120). The edge devices (100) may include one or more edge devices, e.g., edge device A (100A), edge device B (100B), and edge device N (100N). The backup storages (120) may include one or more backup storages, e.g., backup storage A (120A), backup storage B (120B), and backup storage N (120N). The system may include video cameras (not shown). The video cameras may be devices that record visual and/or audio data and provide the video and/or audio data to the edge devices (100). The system may include additional, fewer, and/or different components without departing from the invention. Each of the aforementioned components is discussed below.

In one or more embodiments of the invention, the video cameras are connected to the edge devices through a local connection. The devices (e.g., one or more video cameras and one or more edge devices) in a local connection may share the same geographic location. The local connection may be a local area network (LAN). The devices in the LAN may be connected, for example, through the Transmission Control Protocol (TCP) and Internet Protocol (IP) Ethernet connections or Wi-Fi. Further, the local connection may encompass various interconnected, network-enabled subcomponents (or systems) (e.g., switches, routers, gateways, etc.) (not shown) that may facilitate communications between the above-mentioned devices of the local connection. The local connection may be another type of local area network and/or may be implemented with other and/or additional connections, devices, and/or protocols without departing from the invention.

In one or more embodiments of the invention, the edge devices (100) are connected to the backup storages (120) through a non-local connection. The devices (e.g., one or more edge devices and one or more backup storages) in a non-local connection may span any number of geographic locations of any size without departing from the invention. The non-local connection may be, for example, one or more wide area networks (WANs) such as the Internet. A WAN may connect any number of local connections to allow communications and data transmission from one geographic location to another. The WAN may encompass various interconnected, network-enabled subcomponents (or systems) (e.g., switches, routers, gateways, etc.) (not shown) that may facilitate communications between the above-mentioned non-local connection devices. Moreover, the non-local connection components and devices may communicate with one another using any combination of wired and/or wireless communication protocols. The non-local connection may be another type of network connection spanning multiple geographic locations and/or may be implemented with other and/or additional connections and/or devices without departing from the invention.

In one or more embodiments of the invention, the edge devices (100) include the functionality to process video data obtained from video cameras and/or backup storages (120). The edge devices may also include the functionality to manage the storage and provision of video data to and from video cameras, backup storages (120), and/or users (not shown) of the system. For additional information regarding the edge devices (100), refer to FIG. 1B.

Figure 11:
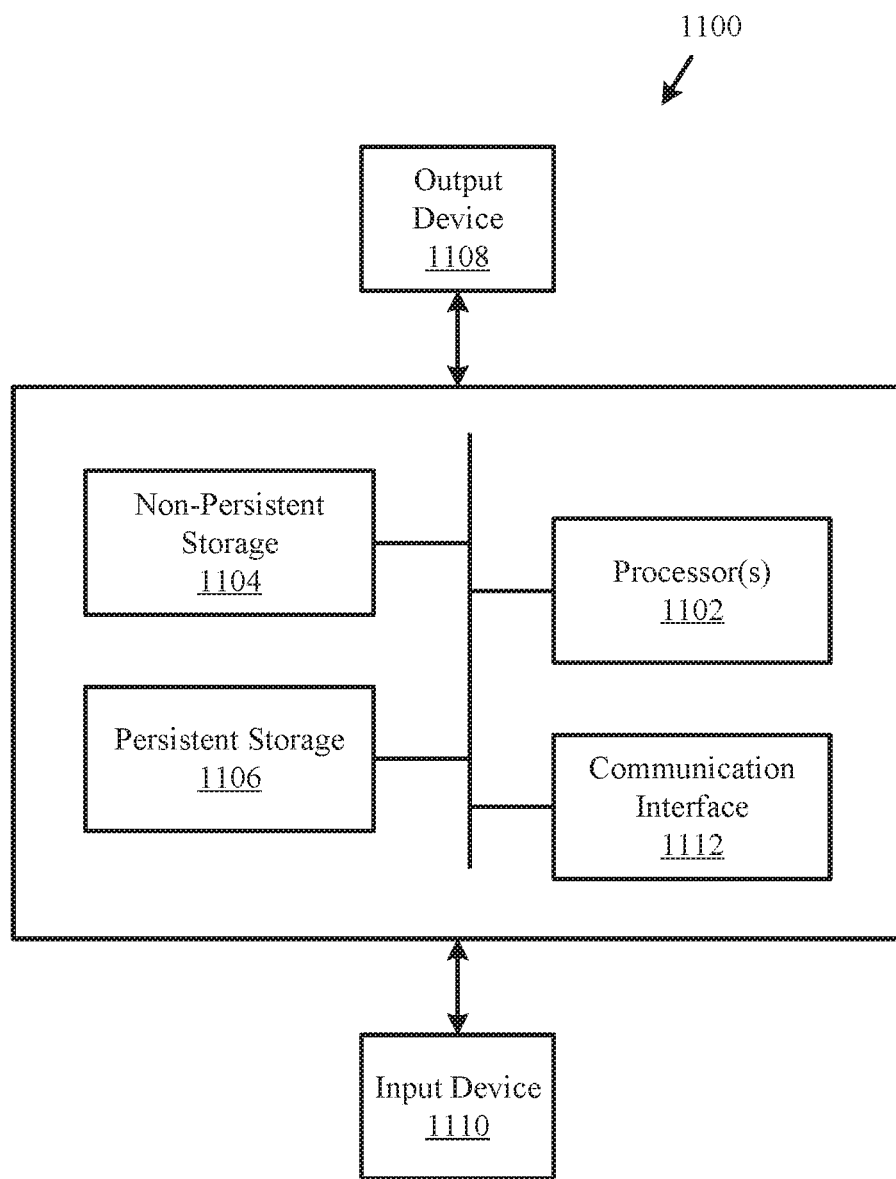
FIG. 11 shows a diagram of a computing system in accordance with one or more embodiments of the invention.

In one or more embodiments of the invention, each of the edge devices (100) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of an edge device (e.g., 100A) described throughout this application.

In one or more embodiments of the invention, each of the edge devices (100) is implemented as a logical device. The logical device may utilize the computing resources of any number of computing devices and thereby provide the functionality of the edge devices (100) described throughout this application.

In one or more embodiments of the invention, the backup storages (120) include the functionality to store video data and video metadata obtained from the edge devices (100). The backup storages (120) may also include the functionality to provide video data to the edge devices (100). For additional information regarding the backup storages (120), refer to FIG. 1C.

In one or more embodiments of the invention, each of the backup storages (120) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a backup storage (e.g., 120A) described throughout this application.

In one or more embodiments of the invention, each of the backup storages (120) is implemented as a logical device. The logical device may utilize the computing resources of any number of computing devices and thereby provide the functionality of the backup storages (120) described throughout this application.

Figure 1B:
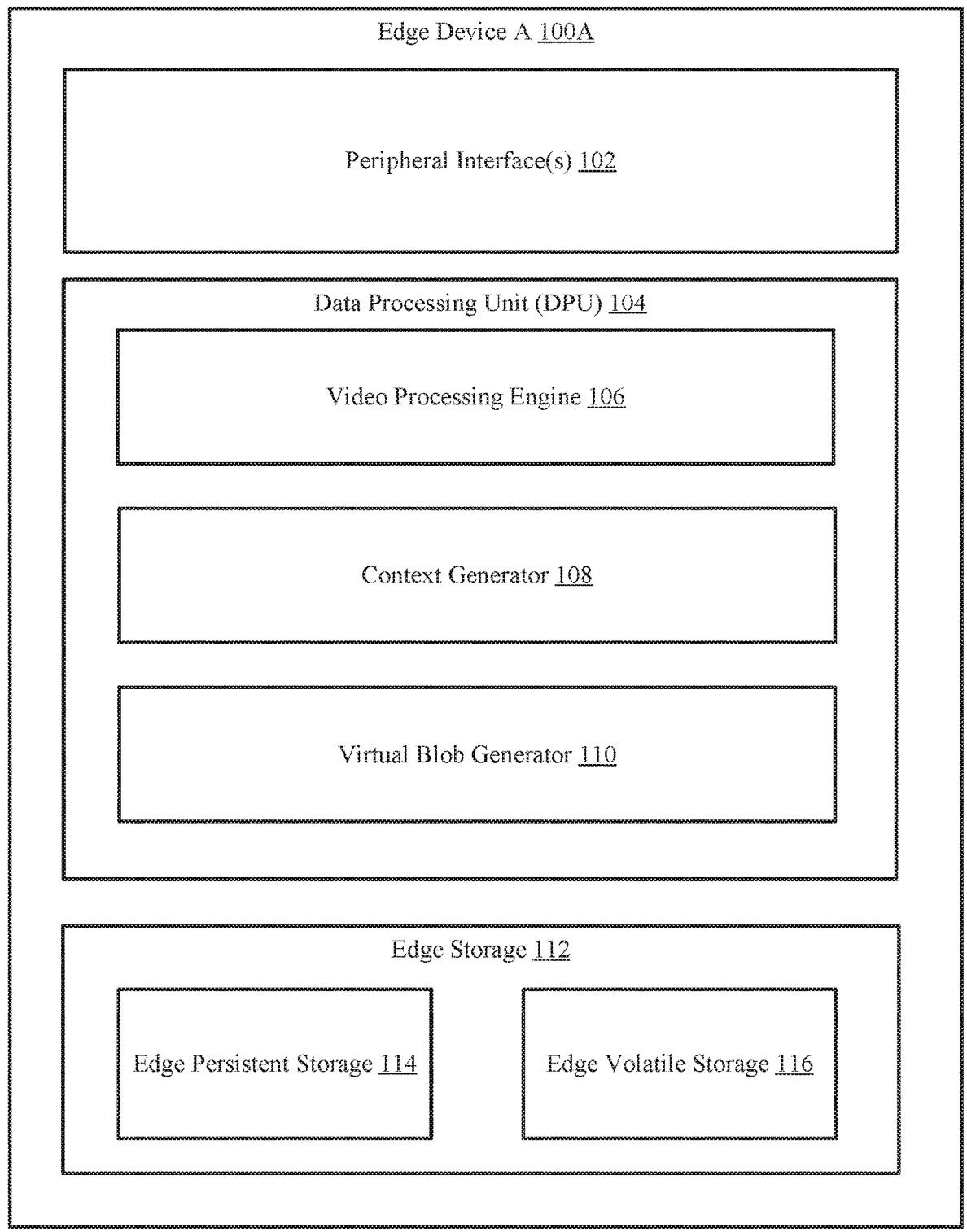
FIG. 1B shows a diagram of an edge device in accordance with one or more embodiments of the invention.

FIG. 1B shows a diagram of an edge device in accordance with one or more embodiments of the invention. Edge device A (100A) may be an embodiment of an edge device (e.g., 100A, FIG. 1A) discussed above. As discussed above, edge device A (100A) may include the functionality to process video data and manage the storage and provision of video data to and from users, video cameras, and backup storages (120, FIG. 1A). Edge device A (100A) may include a peripheral interface(s) (102), a data processing unit (DPU) (104), and edge storage (112). Edge device A (100A) may include additional, fewer, and/or different components without departing from the invention. Each of the aforementioned components is discussed below.

In one or more embodiments of the invention, the peripheral interface(s) (102) include the functionality to facilitate communications between edge device A (100A) and one or more video cameras (not shown in the system illustrated in FIG. 1A. There may be one or more peripheral interfaces (102) providing communications between one or more video cameras and edge device A (100A) without departing from the invention. The peripheral interface(s) (102) may include any type of communication interface that enables a physical or wireless connection to be established between the edge device A (100A) and another device (i.e., video camera). The peripheral interface(s) (102) may be implemented using a combination of physical ports and corresponding hardware and/or software. The specific hardware and/or software used to implement the communication interfaces may vary based on the communication protocol used. Examples of communication protocols include, but are not limited to, Ethernet and Infiniband.

In one or more embodiments of the invention, the peripheral interface(s) (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the peripheral interface(s) (102) described throughout this application.

In one or more embodiments of the invention, the peripheral interface(s) (102) is implemented as computer instructions, e.g., computer code, stored on a persistent storage that when executed by a processor of edge device A (100A) causes edge device A (100A) to provide the functionality of the peripheral interface(s) (102) described throughout this application.

In one or more embodiments of the invention, the DPU (104) includes the functionality to process video data. The DPU (104) may process video data via indexing operations, contextual operations, storage tier operations, compliance operations, authentication and authorization operations, long term stitching operations, contextual stitching operations, and right to be forgotten (RTF) operations. The DPU may include the functionality to perform other types of video data processing operations (e.g., deduplication and erasure coding) without departing from the invention. Each of these operations is discussed below.

An indexing operation may refer to generating indexing metadata (discussed below) associated with video data obtained from a video camera and/or a backup storage (e.g., 120A). The indexing metadata may include indexing information associated with the video data. The indexing information may specify information regarding the video data chunks of the video data such as start times, end times, subjects included in the video data, and objects included in the video data. The indexing information may include other information regarding the video data without departing from the invention. The indexing metadata may enable efficient searching of relevant video data chunks stored in backup storages (120, FIG. 1A). For additional information regarding the indexing operation, refer to FIG. 3A.

A contextual operation may refer to generating contextual metadata (discussed below) associated with video data obtained from a video camera and/or a backup storage (e.g., 120A). The contextual metadata may include contextual information associated with video data chunks. The contextual information may include, for example, what emotion(s) are shown by a person, actions taken by a person, and other and/or additional contextual information associated with video data without departing from the invention. The contextual metadata may further optimize the searching of video data stored in backup storages (120, FIG. 1A). For additional information regarding a contextual operation, refer to FIG. 4A.

A storage tier operation may refer to generating storage tier metadata (discussed below) associated with video data obtained from a video camera and/or a backup storage (e.g., 120A). The storage tier metadata may specify storage types video data chunks of the video data are to be stored in based on the video data chunk content. The storage tier metadata may be used to store highly relevant video data chunks in fast-access storage and less relevant data in more cost-effective storage. The storage tier metadata may allow the DPU (104) to efficiently store the video data in backup storages (120, FIG. 1A). For additional information regarding a storage tier operation, refer to FIG. 5A.

A compliance operation may refer to generating compliance metadata (discussed below) associated with video data obtained from a video camera and/or a backup storage (e.g., 120A). The compliance metadata may specify compliance requirements associated with video data chunks of the video data based on the video data chunk content. The compliance metadata may be used to efficiently store video data chunks in backup storages (120, FIG. 1A) while following compliance requirements associated with the video data. For additional information regarding a compliance operation, refer to FIG. 6A.

An authentication and authorization (AA) operation may refer to generating (AA) metadata (discussed below) associated with video data obtained from a video camera and/or a backup storage (e.g., 120A). The AA metadata may specify authentication and authorization information associated with video data. The AA metadata may be used to ensure authorized users are able to access video data stored in backup storages (120, FIG. 1A) and the type of access that each authorized user has. The AA metadata may improve the security of the video data stored in backup storages (120, FIG. 1A). For additional information regarding an AA operation, refer to FIG. 7A.

A long term stitching operation may refer to generating retention and staging metadata (discussed below) associated with video data obtained from a video camera and/or a backup storage (e.g., 120A). The retention and staging metadata may specify storage types and retention periods associated with video data. The retention and staging metadata may be used to efficiently store video data stored in backup storages (120, FIG. 1A), properly de-stage video data from one type of storage to another, and to stitch video data chunks of the video data when the video data chunks are all de-staged to archival storage. For additional information regarding an AA operation, refer to FIG. 8A.

A contextual stitching operation may refer to searching for video data chunks stored in backup storages (120, FIG. 1A) and providing video data chunks to users. The DPU (104) may search for video data chunks based on indexing metadata and/or contextual metadata, and may use the AA metadata associated with the video data chunks to ensure that only authorized users are enables to view the video data chunks. A contextual stitching operation may improve the efficiency and security of searching for and providing video data to users of the system. For additional information regarding a contextual stitching operation, refer to FIG. 9A.

A right to be forgotten (RTF) operation may refer to deleting video data of people who are not associated with any wrongdoing. The DPU (104) may efficiently search for and obtain video data associated with a person using indexing metadata and contextual metadata, and may determine any wrongdoing associated with the video data. The DPU (104) may verify any wrongdoing with users of the system. The DPU (104) may delete the data chunks if the wrongdoing is cleared by the users or may reject the RTF request if the wrongdoing is not cleared by the users. A RTF operation enables support of privacy laws while also mitigating the deletion of video data chunks associated with wrongdoing. For additional information associated with RTF operations, refer to FIG. 10A.

In one or more embodiments of the invention, any given DPU (e.g., 104) includes the functionality to perform any combination of the operations depicted in FIGS. 3A-10B below independently without departing from the invention. For example, a first DPU may only perform indexing operations, contextual operations, and contextual stitching operations. A second DPU may only perform storage tier operations, compliance operations, AA operations, and contextual stitching operations. A third DPU may perform all of the aforementioned operations.

The DPU (104) may perform the operations depicted below and generate, manage, and use the different types of metadata generated through performing the operations depicted below in a coexisting manner.

To provide the aforementioned functionality of the DPU (104), the DPU (104) may include a video processing engine (106), a context generator (108), and a virtual blob generator (110). The DPU (104) may include additional, fewer, and/or different components without departing from the invention. Each of the aforementioned components is discussed below.

In one or more embodiments of the invention, the video processing engine (106) includes the functionality to process video data obtained from video cameras and/or backup storages (120, FIG. 1A) to obtain video data chunks and video processing engine outcomes. The video processing engine (106) may include one or more data analytics models (not shown). The data analytics models may be any models that may be applied to video data and generate video data chunks and video processing engine outcomes without departing from the invention. The video processing engine outcomes may be image classifications, object detections, and other and/or additional video processing engine outcomes without departing from the invention. The data analytics models may be any one or more machine learning models, artificial intelligence models, and/or deep learning models that may be used for image classification and object detection (e.g., artificial neural networks) without departing from the invention.

In one embodiment of the invention, the data analytics model(s) may be generated and/or obtained from a user of the system and may execute locally on the DPU (104). The data analytics model(s) may be trained with (i) only training data obtained within the system, (ii) any combination of third party training data and data obtained within the system, or (iii) only third party training data without departing from the invention. The data analytics model(s) may generate one or more video processing engine outcomes, indexing attributes, and/or one or more video data chunks using video data obtained from the system.

In another embodiment of the invention, the data analytics model(s) may be obtained from a third party and may execute remotely on third party devices (not shown in the system of FIG. 1A). The data analytics model(s) may be trained with (i) only training data obtained within the system, (ii) any combination of third party training data and data obtained within the system, or (iii) only third party training data without departing from the invention. The DPU (104) may provide video data to the data analytics model(s) executing on a third party device. The third party device may apply the data analytics model(s) to the video data to obtain one or more video processing engine outcomes, indexing attributes, and/or one or more video data chunks. The third party devices may provide the video processing engine outcomes, indexing attributes, and the video data chunks to the DPU (104), and the DPU (104) may perform the aforementioned operations using the obtained video data chunks, indexing attributes, and the video processing engine outcomes.

In one or more embodiments of the invention, the video processing engine (106) is one or more physical devices. The physical device may include circuitry. The physical device may be, for example, a field-programmable gate array, application specific integrated circuit, programmable processor, microcontroller, digital signal processor, or other hardware processor. The physical device may be adapted to provide the functionality of the video processing engine (106) described throughout this application.

In one or more embodiments of the invention, the video processing engine (106) is implemented as computer instructions, e.g., computer code, stored on a persistent storage that when executed by a processor of edge device A (100A) or the DPU (104) causes edge device A (100A) or the DPU (104) to provide the functionality of the video processing engine (106) described throughout this application.

In one or more embodiments of the invention, the context generator (108) includes the functionality to generate contextual attributes associated with video data. The context generator (106) may also be used to generate text transcripts associated with video data chunks. The context generator (106) may include one or more context generation models. The context generation models may include natural language processing models and/or body language detection models. The natural language processing models and body language detection models may be any mathematical models (e.g., artificial neural networks that include speech recognition and optical character recognition) that generate contextual attributes (e.g., behavioral and/or linguistic characteristics of a subject) associated with video data without departing from the invention. The context generator (106) may include other and/or additional functionality without departing from the invention.

In one embodiment of the invention, the natural language processing models and/or body language detection models may be generated and/or obtained from a user of the system and may execute locally on the DPU (104). The natural language processing models and/or body language detection models may be trained with (i) only training data obtained within the system, (ii) any combination of third party training data and training data obtained within the system, or (iii) only third party training data without departing from the invention. The natural language processing models and/or body language detection models may generate contextual attributes using video data obtained from the system.

In another embodiment of the invention, the natural language processing models and/or body language detection models may be obtained from a third party and may execute remotely on third party devices (not shown in the system of FIG. 1A). The natural language processing models and/or body language detection models may be trained with (i) only training data obtained within the system, (ii) any combination of third party training data and data obtained within the system, or (iii) only third party training data without departing from the invention. The DPU (104) may provide video data and indexing attributes to the natural language processing models and/or body language detection models executing on a third party device. The third party device may apply the natural language processing models and/or body language detection models to the video data and indexing attributes to obtain contextual attributes. The third party devices may provide the contextual attributes to the DPU (104), and the DPU (104) may perform the one or more aforementioned operations using the obtained contextual attributes.

In one or more embodiments of the invention, the context generator (108) is one or more physical devices. The physical device may include circuitry. The physical device may be, for example, a field-programmable gate array, application specific integrated circuit, programmable processor, microcontroller, digital signal processor, or other hardware processor. The physical device may be adapted to provide the functionality of the context generator (108) described throughout this application.

In one or more embodiments of the invention, the context generator (108) is implemented as computer instructions, e.g., computer code, stored on a persistent storage that when executed by a processor of edge device A (100A) or the DPU (104) causes edge device A (100A) or the DPU (104) to provide the functionality of the context generator (108) described throughout this application.

In one or more embodiments of the invention, the virtual blob generator (110) includes the functionality to generate virtual blobs associated with video data stored in backup storages (120, FIG. 1A). The virtual blob generator (110) may include the functionality to generate virtual blob files that include AA metadata, indexing metadata, and contextual metadata associated with video data chunks using video data chunks, AA metadata, indexing metadata, and contextual metadata. The virtual blob generator may include other and/or additional functionality without departing from the invention.

In one or more embodiments of the invention, the virtual blob generator (110) is one or more physical devices. The physical device may include circuitry. The physical device may be, for example, a field-programmable gate array, application specific integrated circuit, programmable processor, microcontroller, digital signal processor, or other hardware processor. The physical device may be adapted to provide the functionality of the virtual blob generator (110) described throughout this application.

In one or more embodiments of the invention, the virtual blob generator (110) is implemented as computer instructions, e.g., computer code, stored on a persistent storage that when executed by a processor of edge device A (100A) or the DPU (104) causes edge device A (100A) or the DPU (104) to provide the functionality of the virtual blob generator (110) described throughout this application.

In one or more embodiments of the invention, the DPU (104) is one or more physical devices. The physical device may include circuitry. The physical device may be, for example, a field-programmable gate array, application specific integrated circuit, programmable processor, microcontroller, digital signal processor, or other hardware processor. The physical device may be adapted to provide the functionality of the DPU (104) described throughout this application.

In one or more embodiments of the invention, the DPU (104) is implemented as computer instructions, e.g., computer code, stored on a persistent storage that when executed by a processor of edge device A (100A) causes edge device A (100A) to provide the functionality of the DPU (104) described throughout this application.

In one or more embodiments of the invention, the edge storage (112) stores data. The data stored in edge storage (112) may include video data and video metadata (both discussed below, see FIG. 2B). The edge storage (112) may store other and/or additional data without departing from the invention. The edge storage (112) may include edge persistent storage (114) and edge volatile storage (116). The edge storage (112) may include additional, fewer, and/or different components without departing from the invention. Each of the aforementioned components is discussed below.

In one or more embodiments of the invention, edge persistent storage (114) stores video metadata. For additional information regarding video metadata, refer to FIG. 2A. The edge persistent storage (114) may be a form of non-volatile storage. In other words, edge persistent storage (114) may not require constant power to retain data. Edge persistent storage (114) may store video metadata generated by the DPU (104) and provide video metadata to the DPU (104). Edge persistent storage (114) may store other and/or additional data without departing from the invention.

In one or more embodiments of the invention, edge volatile storage (116) stores video data. For additional information regarding video data, refer to FIG. 2B. The edge volatile storage (116) may be a form of volatile storage. In other words, the edge volatile storage (116) may require power to retain data. The edge volatile storage (116) may store and provide data faster than edge persistent storage (114). Edge volatile storage (116) may store video data obtained from video cameras for processing or video data obtained from backup storages (120, FIG. 1A) to provide to users of the system. Edge volatile storage (116) may store other and/or additional data without departing from the invention.

Edge storage (112) may be implemented using physical storage devices and/or logical storage devices. The physical storage devices may include any combination of hard disk drives, solid state disk drives, tape drives, random-access memory (RAM), and/or any other physical storage mediums for the storage of data.

The logical storage devices (e.g., virtualized storage) may utilize any quantity of hardware storage resources of any number of computing devices for storing data. For example, the edge storage (112) may utilize portions of any combination of hard disk drives, solid state disk drives, tape drives, random-access memory (RAM), and/or any other physical storage medium of any number of computing devices.

Figure 1C:
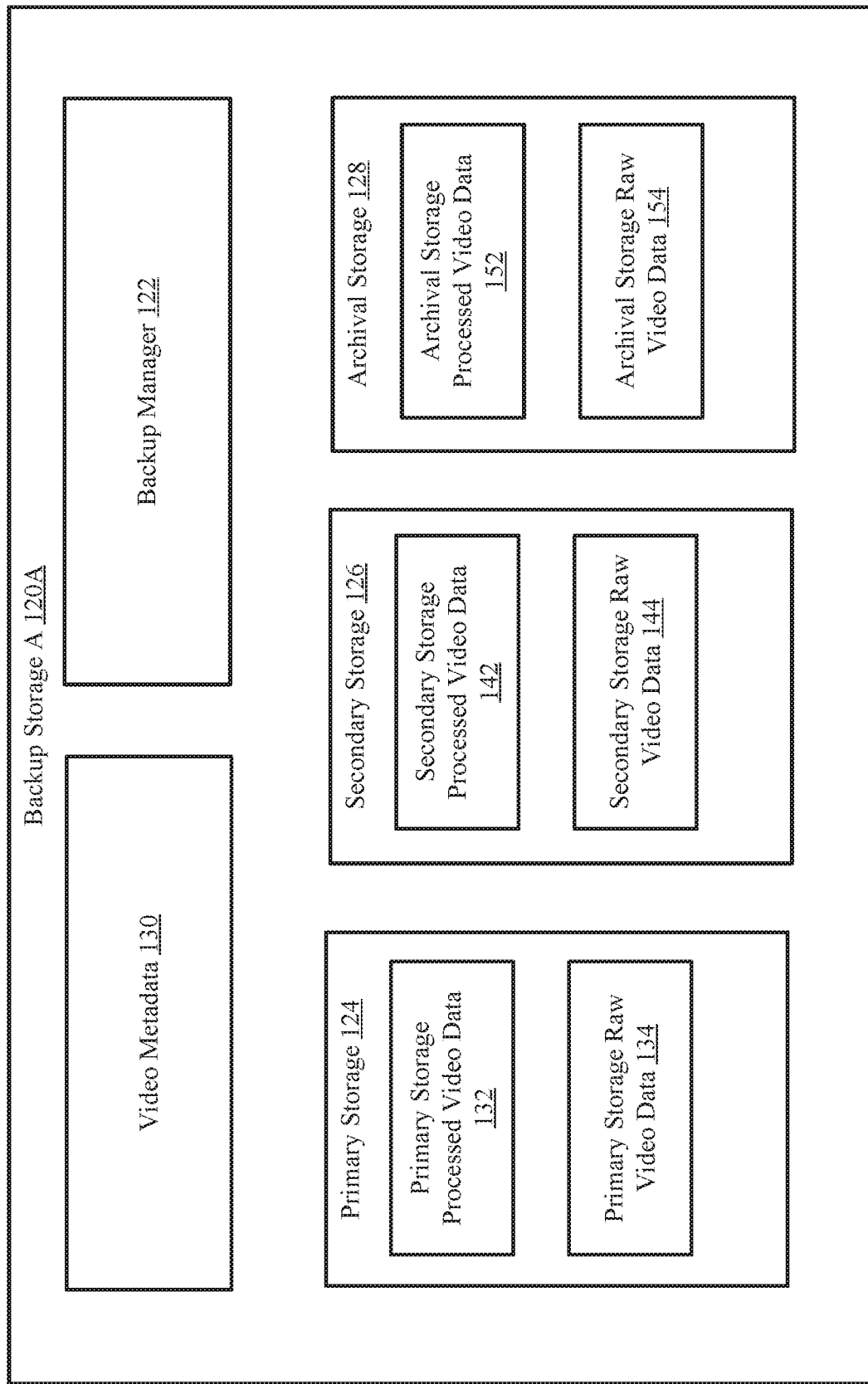
FIG. 1C shows a diagram of a backup storage in accordance with one or more embodiments of the invention.

FIG. 1C shows a diagram of a backup storage in accordance with one or more embodiments of the invention. Backup storage A (120A) may be an embodiment of a backup storage (e.g., 120A, FIG. 1A) discussed above. As discussed above, backup storage A (120A) may include the functionality to store video data. Backup storage A (120A) may include a backup manager (122), primary storage (124), secondary storage (126), and archival storage (128). Backup storage A (120A) may include additional, fewer, and/or different components without departing from the invention. Each of the aforementioned components is discussed below.

In one or more embodiments of the invention, the backup manager (122) includes the functionality to store video data obtained from edge devices (100, FIG. 1A) in primary storage (124), secondary storage (126), and archival storage (128) and provide video data to edge devices (100, FIG. 1A). The backup manager (122) may also include the functionality to de-stage (i.e., move video data from one storage to another) video data and delete video data. The backup manager (122) may include other and/or additional functionality without departing from the invention.

In one or more embodiments of the invention, the backup manager (122) is one or more physical devices. The physical device may include circuitry. The physical device may be, for example, a field-programmable gate array, application specific integrated circuit, programmable processor, microcontroller, digital signal processor, or other hardware processor. The physical device may be adapted to provide the functionality of the backup manager (122) described throughout this application.

In one or more embodiments of the invention, the backup manager (122) is implemented as computer instructions, e.g., computer code, stored on a persistent storage that when executed by a processor of backup storage A (120A) causes backup storage A (120A) to provide the functionality of the backup manager (122) described throughout this application.

In one or more embodiments of the invention, the primary storage (124) stores primary storage processed video data (132) and the primary storage raw video data (134). The primary storage (124) may be high performance storage (e.g., may include fast read/writes speeds) and may be used for highly relevant video data. Storing video data in primary storage (124) may be expensive. The primary storage (124) may include a higher performance than the secondary storage (126) and the archival storage (128), and the primary storage (124) may be more expensive than secondary storage (126) and archival storage (128). Primary storage (124) may be used for short term storage of video data. Primary storage (124) may store other and/or additional data and may include other and/or additional functionalities without departing from the invention.

In one or more embodiments of the invention, the secondary storage (126) stores secondary storage processed video data (142) and secondary storage raw video data (144). The secondary storage (126) may be medium performance storage (e.g., may include medium read/writes speeds). The secondary storage (126) may include a higher performance than the archival storage (128), but a lower performance than the primary storage (124). The secondary storage (126) may be more expensive than archival storage (128) but less expensive than the primary storage (124). Secondary storage (126) may be used for medium term storage of video data. Secondary storage (126) may store other and/or additional data and may include other and/or additional functionalities without departing from the invention.

In one or more embodiments of the invention, the archival storage (128) stores archival storage processed video data (152) and archival storage raw video data (154). The archival storage (128) may be low performance storage (e.g., may include slow read/writes speeds) and may be used for non-highly relevant video data. Storing video data in archival storage (128) may be cheap. The archival storage (128) may include a lower performance than the primary storage (124) and the secondary storage (126) and the archival storage (128), but may be cheaper than the primary storage (124) and the secondary storage (126). Archival storage (128) may be used for long term storage of video data. Archival storage (128) may store other and/or additional data and may include other and/or additional functionalities without departing from the invention.

In one or more embodiments of the invention, processed video data, e.g., primary storage processed video data (132), secondary storage processed video data (142), and archival storage processed video data (152), includes video data processed by the DPU (104, FIG. 1B). For additional information regarding processed video data, refer to FIG. 1B.

Raw video data, e.g., primary storage raw video data (134), secondary storage raw video data (144), and archival storage raw video data (154), may include video data not processed by the DPU (104, FIG. 1B). The raw video data may not include video metadata associated with the video data. The raw video data may only include video data chunks.

The primary storage (124), secondary storage (126), and archival storage (128) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the primary storage (124), secondary storage (126), and archival storage (128) may utilize portions of any combination of hard disk drives, solid state disk drives, tape drives, and/or any other physical storage medium of any number of computing devices.

Figure 2A:
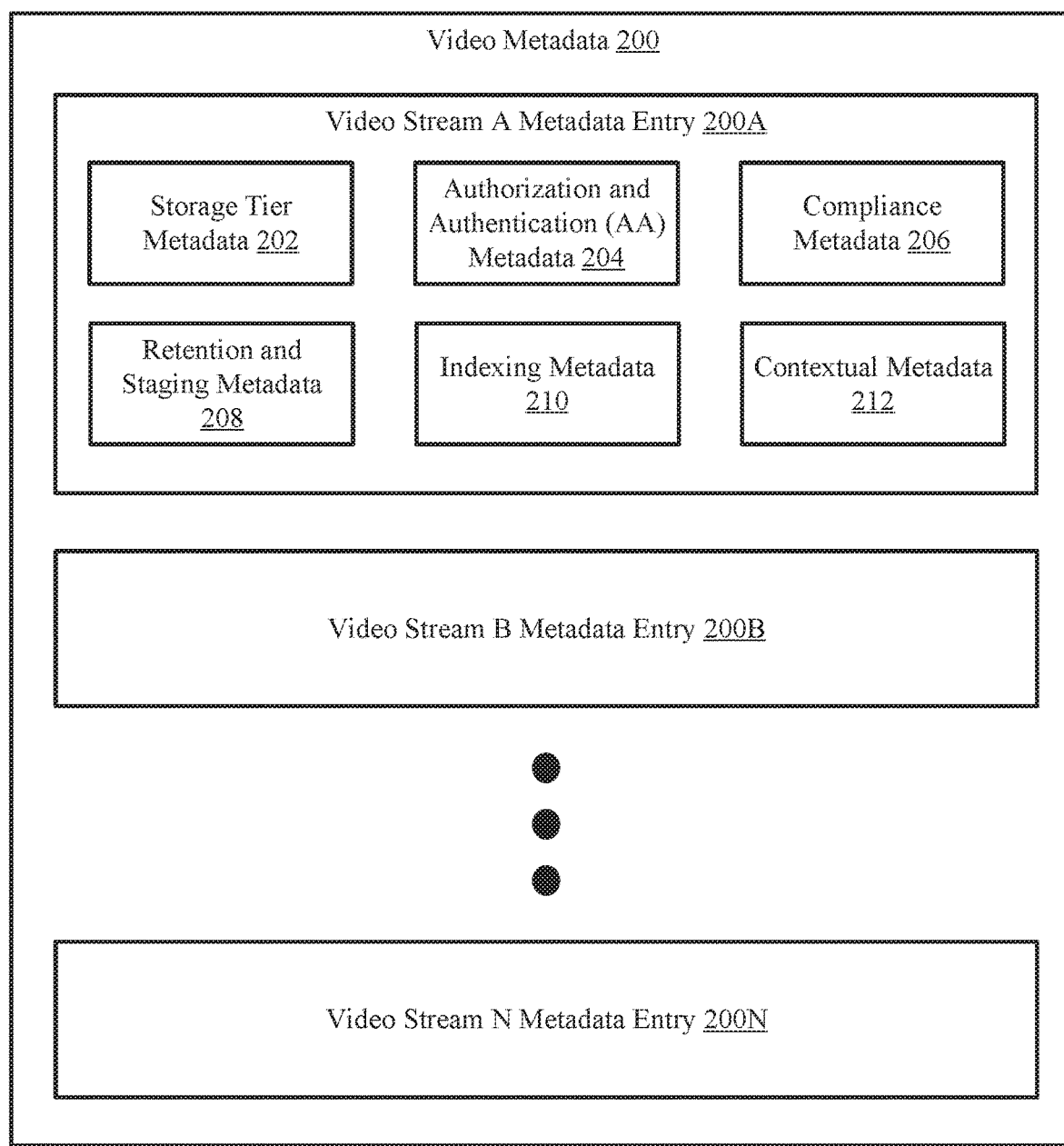
FIG. 2A shows a diagram of video metadata in accordance with one or more embodiments of the invention.

FIG. 2A shows a diagram of video metadata (200) in accordance with one or more embodiments of the invention. As discussed above, video metadata (200) may include information regarding video data obtained from video cameras and/or backup storages (120, FIG. 1A). The video metadata (200) may include one or more video stream metadata entries, e.g., video stream A metadata entry (200A), video stream B metadata entry (200B), video stream N metadata entry (200N). Each video stream metadata entry (e.g., 200A) may include one or more data structures that include information regarding the video data associated with the video stream. Each video stream metadata entry (e.g., 200A) may include storage tier metadata (202), authentication and authorization (AA) metadata (204), compliance metadata (206), retention and staging metadata (208), indexing metadata (210), and contextual metadata (212). Each of the video stream metadata entries may include other and/or additional data structures without departing from the invention. Each of the aforementioned data structures is discussed below.

Storage tier metadata (202) may be one or more data structures generated by the DPU (104, FIG. 1B) during a storage tier operation. The storage tier metadata (202) may include storage tier identifiers. The storage tier identifiers may be unique, global bit strings that are associated with a type of storage. One storage tier identifier may be associated with primary storage (e.g., 124, FIG. 1C), one storage tier identifier may be associated with secondary storage (e.g., 126, FIG. 1C), and one storage tier identifier may be associated with archival storage (e.g., 128, FIG. 1C). The storage tier metadata (202) may include the video data chunk identifiers of each video data chunk associated with the storage tier metadata. Each video data chunk identifier may be associated with one of the storage tier identifiers. The DPU (104, FIG. 1B) may use the storage tier metadata (202) to efficiently store video data chunks in backup storages (120, FIG. 1A). Storage tier metadata may also include reference counts, which, if a video data chunk is stored in one storage but referenced multiple times, indicates how many references (e.g., pointers) are associated with the video data chunk. Each video data chunk of a video stream may be associated with similar or different storage tier metadata without departing from the invention. The storage tier metadata may include erasure coding and/or replication flags, which when set, instruct the backup storage to perform erasure coding and/or replication on the video data chunks when stored. Storage tier metadata (202) may include other and/or additional information regarding which type of storage video data chunks are stored within backup storages (120, FIG. 1A) and how they are stored without departing from the invention.

AA metadata (204) may be one or more data structures generated by the DPU (104, FIG. 1B) during an authentication and authorization operation. AA metadata (204) may include authentication and authorization associated with each video data chunk. The authentication and authorization information may include object identifiers, user identifiers, group identifiers, access types, authorization and other and/or additional information regarding the authentication and authorization information associated with video data chunks. The object identifiers may be unique, global bit strings associated with a video data chunk to differentiate a particular video data chunk from other video data chunks.

The user identifiers may be unique, global bit strings associated with a user that has permission to access the video data chunk associated with the user identifiers. The group identifiers may be unique, global bit strings associated with a group that has permission to access the video data chunk associated with the user identifiers. The access type may refer to the type of access a user may have with a video data chunk. The access type may specify whether a video data chunk is full access or placed under legal hold, and the period of time the video data chunk is under legal hold. Full access may refer to video data chunk that may be accessed by a user. Legal hold may refer to a video data chunk that may not be accessed or modified and/or deleted in any way due to ongoing litigation associated with the video data chunk. Authorization may refer to what access a user is authorized to have with a video data chunk. The authorization may specify whether a user has read only access, read and write access, or another type of access without departing from the invention. AA metadata (204) may be used by the DPU (104, FIG. 1B) to secure the video data chunks.

Compliance metadata (206) may be one or more data structures generated by the DPU (104, FIG. 1B) during a compliance operation. The compliance metadata (206) may specify compliance requirements associated with a video data chunk. The compliance requirements may specify geographic location requirements, industry requirements, organization requirements, policy requirements, and/or other and/or additional compliance requirements associated with a video data chunk without departing from the invention. The compliance metadata may be associated with any number of video data chunks of a video stream, where each video data chunk of the video stream may be associated with similar or different compliance metadata without departing from the invention. The compliance metadata (206) may be used by the DPU (140, FIG. 1B) and backup storages (120, FIG. 1A) to store video data chunks in storages that meet compliance requirements.

Retention and staging metadata (208) may be one or more data structures generated by the DPU (104, FIG. 1B) during a retention and staging operation. Retention and staging metadata (208) may include retention and staging information associated with each video data chunk. The retention information may specify a long term retention period, or an amount of time the video data chunk may not be deleted from the backup storage (e.g., 120A, FIG. 1A). The staging information may specify the storage type(s) (e.g., primary storage, secondary storage, and/or archival storage) a video data chunk is to be stored into and a retention period each storage type, or an amount of time the video data chunk is to be stored in each storage type. The retention and staging metadata may also include the storage locations of each video data chunk in the backup storages. The DPU (104, FIG. 1B) may use the retention and staging metadata (208) to store video data chunks in appropriate storage types and track the storage locations of video data chunks as de-staging occurs by the backup storages (120A, FIG. 1A). The backup storages (120A, FIG. 1A) may using the retention and staging metadata (208) to de-stage video data chunks to different storage types.

Indexing metadata (210) may be one or more data structures generated by the DPU (104, FIG. 1B) during an indexing operation. The indexing metadata (210) may include indexing information associated with each video data chunk. The indexing information may include video data chunk identifiers, stream identifiers, start times, end times, indexing attributes, and a reference count. The video data chunk identifiers may be unique, global bit strings associated with video data chunks to differentiate video data chunks from other video data chunks. The stream identifiers may be unique, global bit strings associated with video streams (i.e., collection of video data chunks) to differentiate video streams from other video streams. Start times may represent timestamps in the video stream at which video data chunks start. Stop times may represent timestamps in the video stream at which video data chunks end. Indexing attributes may specify people, objects, scenes, or any other relevant portion or subject of the video stream without departing from the invention. Reference counts may specify how many times a video data chunk is stored in the backup storages (120, FIG. 1A). The indexing metadata may include other and/or additional information regarding the video data chunks without departing from the invention. The indexing metadata (210) may be used by the DPU (104, FIG. 1B) to search for video data chunks stored in backup storages (120, FIG. 1A).

Contextual metadata (212) may be one or more data structures generated by the DPU (104, FIG. 1B) during a contextual operation. Contextual metadata (212) may include contextual attributes associated with the video data chunks. The contextual attributes may include behavior and/or language tags. Behavior tags may indicate the actions and or emotions exhibited by a person in a video. Language tags may indicate what an individual said in a video. The contextual metadata (212) may include other and/or additional information associated with video data chunks without departing from the invention.

While the data structures (e.g., 202, 204, 206, 208, 210, 212) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be stored in different locations (e.g., in persistent storage of other computing devices) and/or spanned across any number of computing devices without departing from the invention. Any of the aforementioned data structures may be implemented using, for example, lists, tables, linked lists, databases, and/or other types of data structures.

Figure 2B:
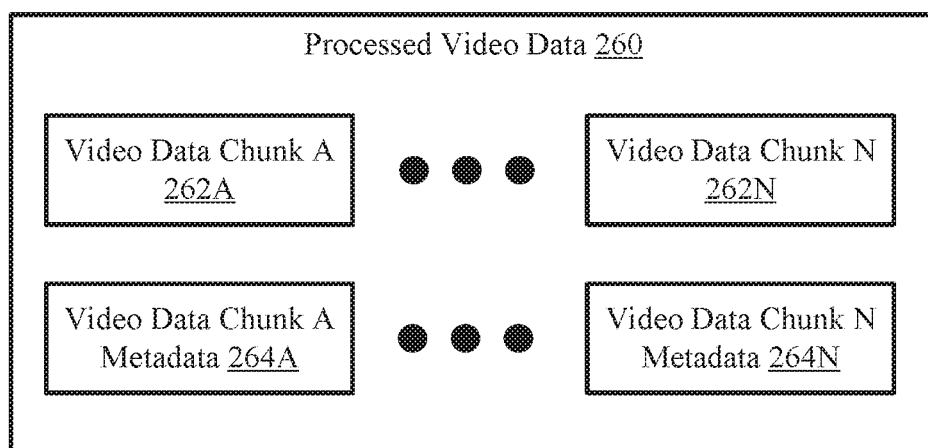
FIG. 2B shows a diagram of processed video data in accordance with one or more embodiments of the invention.

FIG. 2B shows a diagram of processed video data in accordance with one or more embodiments of the invention. The processed video data (260) may be an embodiment of processed video (e.g., 132, 142, 152, FIG. 1C) data discussed above. As discussed above, the processed video data (260) may include video data processed by the DPU (104, FIG. 1B). The processed video data (260) may include one or more video data chunks, e.g., video data chunk A (262A) and video data chunk N (262N), and one or more video data chunk metadata, e.g., video data chunks A metadata (264A) and video data chunk N metadata (264N). The processed video data (260) may include other and/or additional components without departing from the invention. Each of the aforementioned components of the processed video data is discussed below.

A video data chunk (262A, 262N) may be a data structure that includes a portion of video data that was obtained from a video camera. The video data chunks (262A, 262N) may be unique video data chunks that were processed by a DPU (e.g., 104, FIG. 1B) of the system. Each of the video data chunks (262A, 262N) may be used by a DPU (e.g., 104, FIG. 1B) (or another component of the system) to reconstruct video data (e.g., a video file) that was processed and stored in the system.

Video data chunk metadata (264A, 264N) may be a data structure that includes information associated with a video data chunk (e.g., 262A, 262N). Video data chunk metadata may include all, or a portion of the video metadata (discussed above) associated with a video data chunk (e.g., 262A, 262N). For additional information regarding video metadata, refer to FIG. 2A.

Figure 3A:
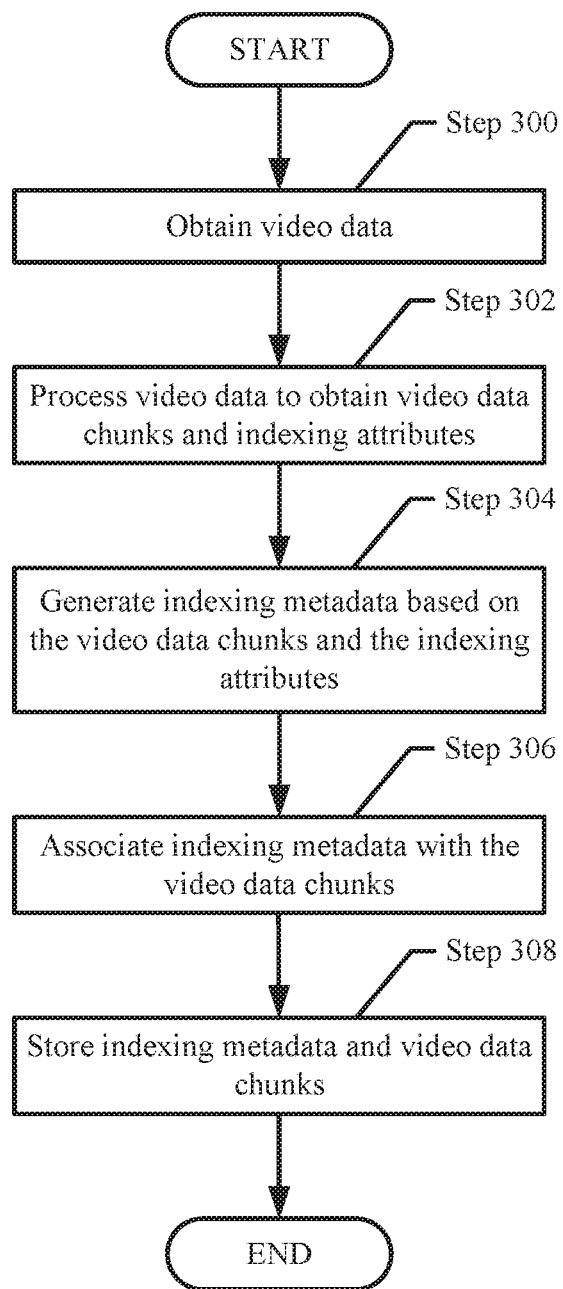
FIG. 3A shows a flowchart of a method for performing an indexing operation on video data in accordance with one or more embodiments of the invention.

FIG. 3A shows a flowchart of a method for performing an indexing operation in accordance with one or more embodiments of the invention. The method shown in FIG. 3A may be performed by, for example, a DPU (e.g., 104, FIG. 1B) of an edge device. Other components of the system illustrated in FIG. 1A may perform all, or a portion, of the method of FIG. 3A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 300, video data is obtained. In one or more embodiments of the invention, the video data is obtained from a video camera. The video camera may send a message to the peripheral interface of the edge device through the local connection. The message may include a video file. The video file may include video data. The video file may include other and/or additional data without departing from the invention. The peripheral interface may provide the video data to the DPU. The video data may be obtained via other and/or additional methods without departing from the invention.

In another embodiment of the invention, a video camera streams the video data to the peripheral interface of the edge device. In other words, the video camera transmits the video data through the local connection to the peripheral device as a steady, continuous flow. The peripheral device may provide the video data to the DPU. The video data may be obtained via other and/or additional methods without departing from the invention.

In another embodiment of the invention, the DPU obtains a request to process video data from a user. The request may specify raw video data stored in a backup storage. As discussed above, raw video data may be video data that has not been processed by a DPU. The DPU may send a message to the backup storage associated with the raw video data through a non-local connection. The message may include a request to obtain raw video data. In response to obtaining the request, the backup storage may send the raw video data to the DPU. The video data may be obtained via other and/or additional methods without departing from the invention.

In step 302, the video data is processed to obtain video data chunks and indexing attributes. In one or more embodiments of the invention, the DPU applies data analytics model(s) (discussed above) of the video processing engine to the video data. The data analytics model(s) may identify one or more indexing attributes associated with the video data. The data analytics model(s) may break up the video data into video data chunks associated with the one or more indexing attributes. Each indexing attribute may be associated with one or more video data chunks. The data analytics model(s) may identify any number of indexing attributes and divide the video data into any number of video data chunks without departing from the invention. The video data may be processed to obtain video data chunks and indexing attributes via other and/or additional methods without departing from the invention.

For example, video data obtained from a checkout security camera. The video data may include the checkouts of two different people. The DPU may apply the data analytics model(s) to the video data. The data analytics model(s) may identify a first person and a second person in the video data. The data analytics model(s) may then divide the video data into two video data chunks, with the first video data chunk associated with the first person and the second video data chunk associated with the second person.

In step 304, indexing metadata is generated based on the video data chunks and the indexing attributes. In one or more embodiments of the invention, the DPU generates indexing metadata using the video data chunks and the indexing attributes. The DPU may generate or update a video stream metadata entry. The DPU may include indexing metadata in the video stream metadata entry. The DPU may generate and include a stream identifier associated with the video data chunks in the indexing metadata. The DPU may generate and include a video data chunk identifier associated with each video data chunk in the indexing metadata. The DPU may generate and include start times and stop times of each video data chunk in the indexing metadata. The DPU may generate and include subject identifiers associated with each indexing attribute in the indexing metadata. The DPU may generate and include other and/or additional information regarding the video data chunks and/or the indexing attributes in the indexing metadata without departing from the invention. The indexing metadata may be generated based on the video data chunks and the indexing attributes via other and/or additional methods without departing from the invention.

In step 306, the indexing metadata is associated with the video data chunks. In one or more embodiments of the invention, the DPU updates the indexing metadata of the video stream metadata entry associated with the video data to associate the indexing metadata with the video data chunks. The DPU may associate the video data chunk identifiers associated with each video data chunk with the information included in the indexing metadata associated with the video data chunk. For example, the DPU may relate the video data chunk identifier associated with a first video data chunk with the indexing attribute included in the first video data chunk, the start time of the first video data chunk, and the end time of the first video data chunk. The indexing metadata may be associated with the video data chunks via other and/or additional methods without departing from the invention.

In step 308, the indexing metadata and the video data chunks are stored. In one or more embodiments of the invention, the DPU stores the indexing metadata in the edge persistent storage of the edge device and the video data chunks in a backup storage. The DPU may also generate copies of all, or a portion, of the indexing metadata and include the copies with the video data chunks stored in the backup storage. The DPU may send a message to the backup storage through the non-local connection. The message may include the video data chunks, the copies of all, or a portion, of the indexing metadata, and a request to store the video data chunks and the copies of the indexing metadata in the backup storage. In response to obtaining the message, the backup storage stores the video data chunks and the copies of indexing metadata in persistent storage. The indexing metadata and the video data chunks may be stored via other and/or additional methods without departing from the invention.

The method may end following step 308.

Figure 3B:
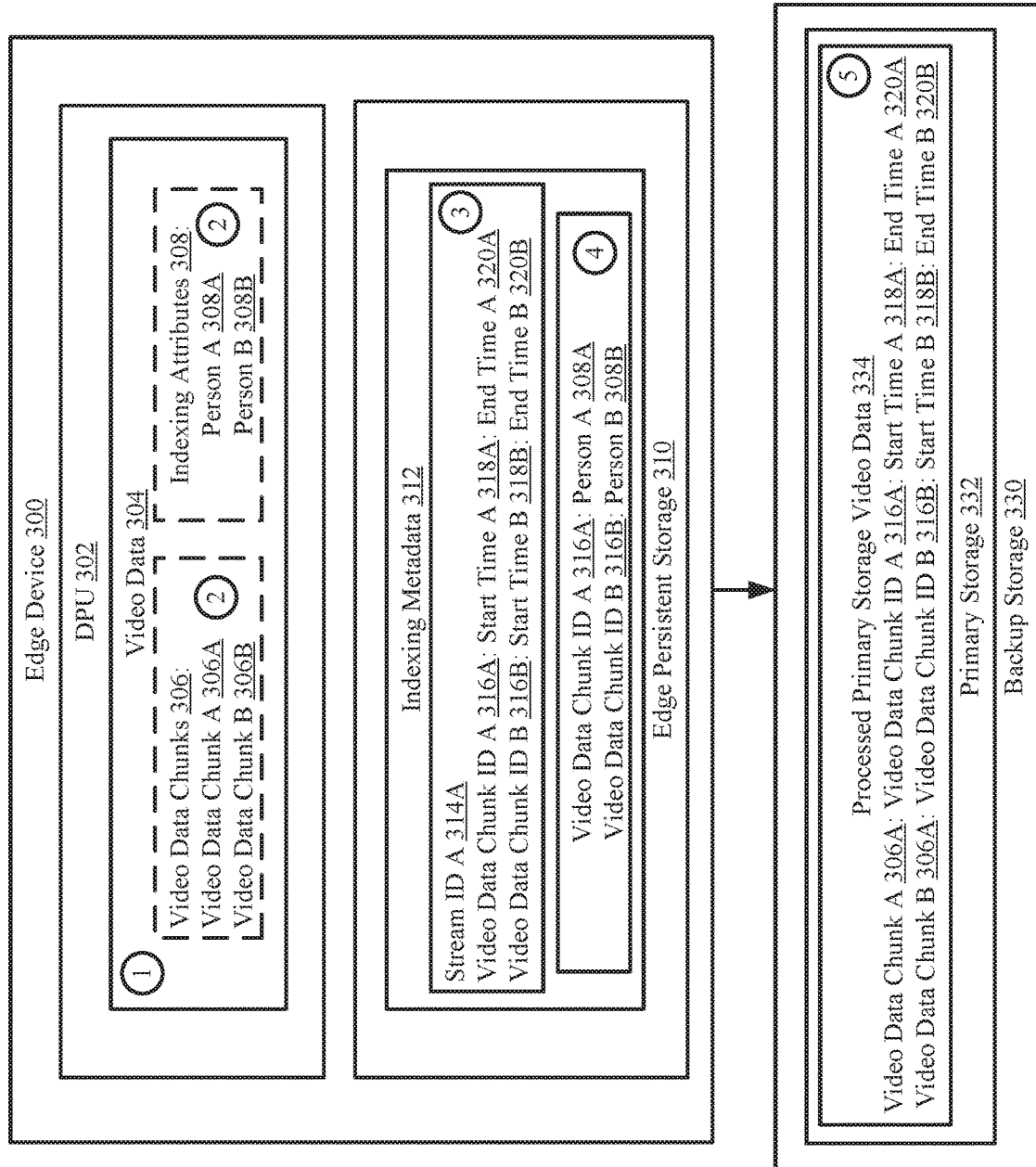
FIG. 3B shows a diagram of a first example in accordance with one or more embodiments of the invention.

FIG. 3B shows a diagram of a first example in accordance with one or more embodiments of the invention. The example depicted in FIG. 3B may depict an indexing operation. The example is not intended to limit the scope of the invention. The example system depicted in FIG. 3B may include fewer components than the systems depicted in FIGS. 1A-1C for the sake of brevity.

Turning to the example, consider a scenario in which a video camera (not shown) provides video data to an edge device (300). The edge device (300) includes a DPU (302) and edge persistent storage (310).

Initially, the DPU (302) obtains video data (304) from a video camera (not shown) [1]. After obtaining the video data (304), the DPU (302) applies the video data to the data analytics models of the video processing engine (not shown) of the DPU (302) to generate video data chunks (306) and indexing attributes (308) [2]. The video data chunks (306) includes video data chunk A (306A) and video data chunk B (306B). The indexing attributes (308) include person A (308A) and person B (308B). Following the generation of the video data chunks (306) and the indexing attributes (308), the DPU (304) generates indexing metadata (312) based on the video data chunks (306) and the indexing attributes (308) [3]. The indexing metadata (312) includes stream ID A (314A) and information associated with both video data chunks (306A, 306B). The information associated with video data chunk A (306A) includes video data chunk ID A (316A), start time A (318A), and end time A (320A). The information associated with video data chunk B (306B) includes video data chunk ID B (316B), start time B (318B), and end time B (320B).

Then, the DPU (304) associates the indexing metadata (312) with the video data chunks (306) by associating the video data chunk IDs (316A, 316B) with the indexing attributes (308A, 308B) with which they are associated [4]. In this example, person A (308A) appears in video data chunk A (306A) and is associated with video data chunk ID A (316A), and person B (308B) appears in video data chunk B (306B) and is associated in video data chunk ID B (316B). Finally, the DPU (304) sends the video data chunks (306A, 306B) and copies of portions of the indexing metadata (312) to the backup storage (330), where video data chunks (306A, 306B) and the copies of portions of the indexing metadata (312) are stored in primary storage (332) as processed primary storage video data (334) [5]. The processed primary storage video data (334) includes video data chunk A (306A), the copies of portions of the indexing metadata associated with video data chunk A (306A) (i.e., video data chunk ID A (316A), start time A (318A), and end time A (320A)), video data chunks B (306B), and the copies of portions of indexing metadata associated with video data chunk B (306B) (i.e., video data chunk ID B (316B), start time B (318B), and end time B (320B)).

Figure 4A:
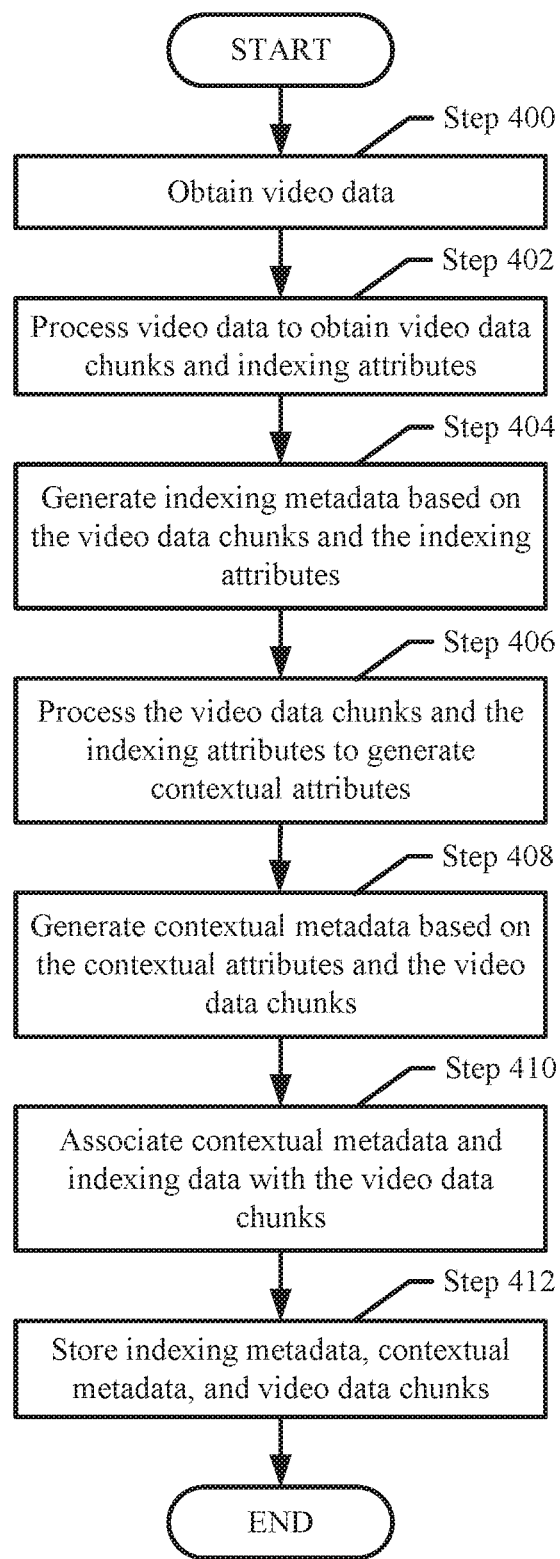
FIG. 4A shows a flowchart of a method for performing a contextual operation on video data in accordance with one or more embodiments of the invention.

FIG. 4A shows a flowchart of a method for performing a contextual operation in accordance with one or more embodiments of the invention. The method shown in FIG. 4A may be performed by, for example, a DPU (e.g., 104, FIG. 1B) of an edge device. Other components of the system illustrated in FIG. 1A may perform all, or a portion, of the method of FIG. 4A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 400, video data is obtained. In one or more embodiments of the invention, the video data is obtained from a video camera. The video camera may send a message to the peripheral interface of the edge device through the local connection. The message may include a video file. The video file may include video data. The video file may include other and/or additional data without departing from the invention. The peripheral interface may provide the video data to the DPU. The video data may be obtained via other and/or additional methods without departing from the invention.

In another embodiment of the invention, a video camera streams the video data to the peripheral interface of the edge device. In other words, the video camera transmits the video data through the local connection to the peripheral device as a steady, continuous flow. The peripheral device may provide the video data to the DPU. The video data may be obtained via other and/or additional methods without departing from the invention.

In another embodiment of the invention, the DPU obtains a request to process video data from a user. The request may specify raw video data stored in a backup storage. As discussed above, raw video data may be video data that has not been processed by a DPU. The DPU may send a message to the backup storage associated with the raw video data through a non-local connection. The message may include a request to obtain raw video data. In response to obtaining the request, the backup storage may send the raw video data to the DPU. The video data may be obtained via other and/or additional methods without departing from the invention.

In step 402, the video data is processed to obtain video data chunks and indexing attributes. In one or more embodiments of the invention, the DPU applies data analytics model(s) (discussed above) of the video processing engine to the video data. The data analytics model(s) may identify one or more indexing attributes associated with the video data. The data analytics model(s) may break up the video data into video data chunks associated with the one or more indexing attributes. Each indexing attribute may be associated with one or more video data chunks. The data analytics model(s) may identify any number of indexing attributes and divide the video data into any number of video data chunks without departing from the invention. The video data may be processed to obtain video data chunks and indexing attributes via other and/or additional methods without departing from the invention.

For example, video data obtained from a checkout security camera. The video data may include the checkouts of two different people. The DPU may apply the data analytics model(s) to the video data. The data analytics model(s) may identify a first person and a second person in the video data. The data analytics model(s) may then divide the video data into two video data chunks, with the first video data chunk associated with the first person and the second video data chunk associated with the second person.

In step 404, indexing metadata is generated based on the video data chunks and the indexing attributes. In one or more embodiments of the invention, the DPU generates indexing metadata using the video data chunks and the indexing attributes. The DPU may generate or update a video stream metadata entry. The DPU may include indexing metadata in the video stream metadata entry. The DPU may generate and include a stream identifier associated with the video data chunks in the indexing metadata. The DPU may generate and include a video data chunk identifier associated with each video data chunk in the indexing metadata. The DPU may generate and include start times and stop times of each video data chunk in the indexing metadata. The DPU may generate and include subject identifiers associated with each indexing attribute in the indexing metadata. The DPU may generate and include other and/or additional information regarding the video data chunks and/or the indexing attributes in the indexing metadata without departing from the invention. The indexing metadata may be generated based on the video data chunks and the indexing attributes via other and/or additional methods without departing from the invention.

In step 406, the video data chunks and the indexing attributes are processed to generate contextual attributes. In one or more embodiments of the invention, the DPU applies context generation model(s) (discussed above) of the context generator to the video data chunks and the indexing attributes. The context generation model(s) may identify any number of contextual attributes associated with each indexing attribute. Each contextual attribute may be associated with a video data chunk. The video data chunks and the indexing attributes may be processed to generate contextual attributes via other and/or additional methods without departing from the invention.

Continuing with the example discussed in step 402, the DPU may apply the context generation model(s) to the two video data chunks and the two indexing attributes (the two people checking out). The context generation model(s) may identify that the first person is nervous and made a pretense, and may therefore generate two contextual attributes, nervous and pretense, associated with the first indexing attribute, the first person. The context generation model(s) may identify that the second person is happy and confident, and may therefore generate two contextual attributes, happy and confident, associated with the second person.

In step 408, contextual metadata is generated based on the video data chunks and the contextual attributes. In one or more embodiments of the invention, the DPU generates the contextual metadata using the contextual attributes and the video data chunks. The DPU may update the video stream metadata entry associated with the video data chunks. The DPU may include contextual metadata in the video stream metadata entry. The DPU may generate and include context identifiers associated with the contextual attributes in the contextual metadata. The DPU may generate and include other and/or additional information regarding the contextual attributes in the contextual metadata without departing from the invention. Contextual metadata may be generated based on the video data chunks and the contextual attributes via other and/or additional methods without departing from the invention.

In step 410, the contextual metadata and indexing metadata are associated with the video data chunks. In one or more embodiments of the invention, the DPU updates the indexing metadata of the video stream metadata entry associated with the video data to associate the indexing metadata with the video data chunks. The DPU may associate the video data chunk identifiers associated with each video data chunk with the information included in the indexing metadata associated with the video data chunk. For example, the DPU may relate the video data chunk identifier associated with a first video data chunk with the indexing attribute included in the first video data chunk, the start time of the first video data chunk, and the end time of the first video data chunk. The indexing metadata may be associated with the video data chunks via other and/or additional methods without departing from the invention.

In one or more embodiments of the invention, the DPU updates the contextual metadata of the video stream metadata entry associated with the video data chunks to associate the contextual metadata with the video data chunks. The DPU may associate the video data chunk identifiers associated with each video data chunk with the context identifiers associated with the video data chunk. The contextual metadata may be associated with the video data chunks via other and/or additional methods without departing from the invention.

In step 412, the indexing metadata, contextual metadata, and the video data chunks are stored. In one or more embodiments of the invention, the DPU stores the indexing metadata and contextual metadata in the edge persistent storage of the edge device and the video data chunks in a backup storage. The DPU may also generate copies of all, or a portion, of the indexing metadata and the contextual metadata and include the copies with the video data chunks stored in the backup storage. The DPU may send a message to the backup storage through the non-local connection. The message may include the video data chunks, the copies of all, or a portion, of the indexing metadata and contextual metadata, and a request to store the video data chunks and the copies of the indexing metadata and contextual metadata in the backup storage. In response to obtaining the message, the backup storage may store the video data chunks and the copies of indexing metadata and contextual metadata in persistent storage. The indexing metadata, contextual metadata, and the video data chunks may be stored via other and/or additional methods without departing from the invention.

The method may end following step 412.

Figure 4B:
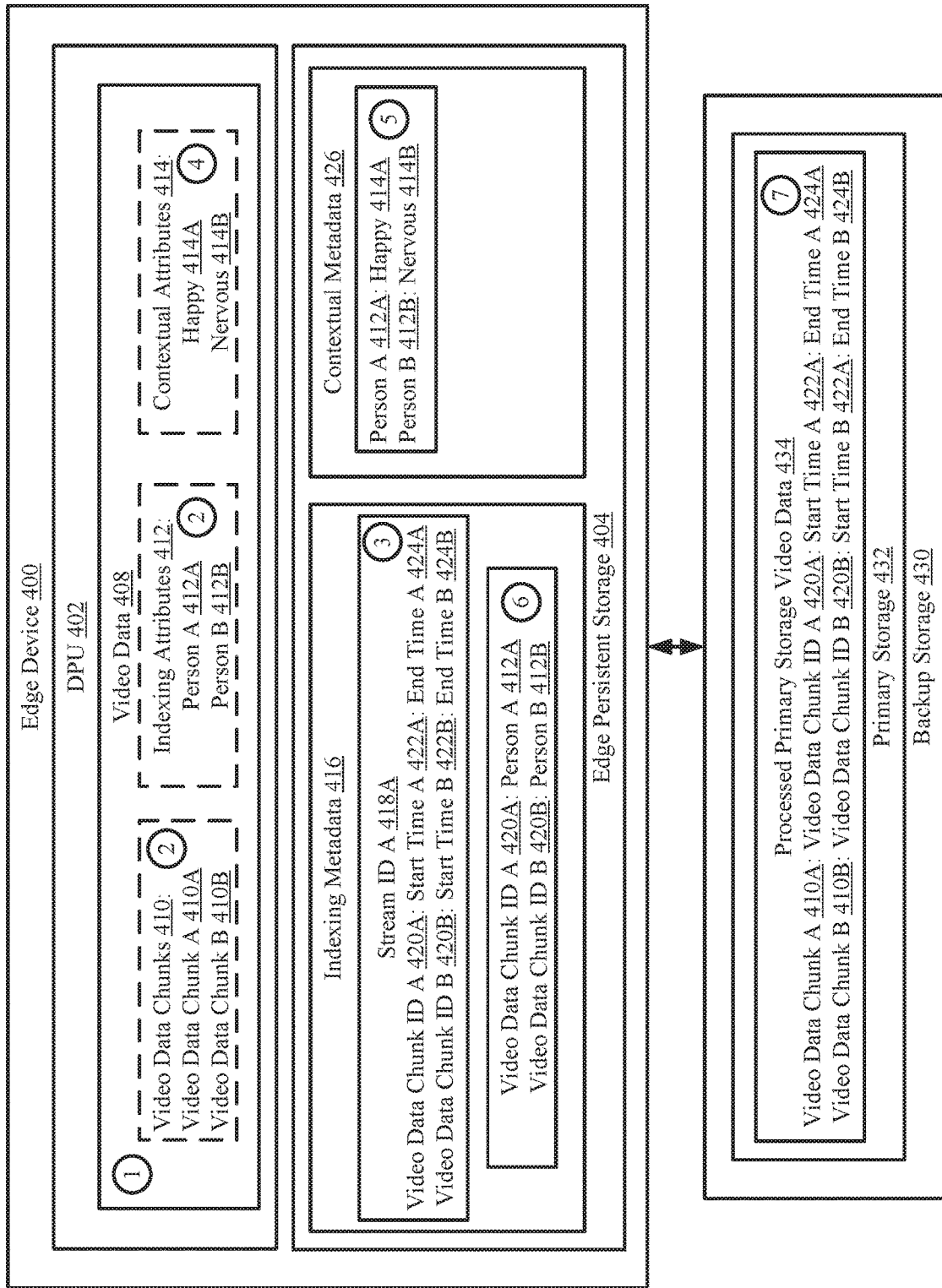
FIG. 4B shows a diagram of a second example in accordance with one or more embodiments of the invention.

FIG. 4B shows a diagram of a second example in accordance with one or more embodiments of the invention. The example depicted in FIG. 4B may depict a contextual operation. The example is not intended to limit the scope of the invention. The example system depicted in FIG. 4B may include fewer components than the systems depicted in FIGS. 1A-1C for the sake of brevity.

Turning to the example, consider a scenario in which a video camera (not shown) provides video data to an edge device (400). The edge device (400) includes a DPU (402) and edge persistent storage (404).

Initially, the DPU (402) obtains video data (408) from a video camera (not shown) [1]. After obtaining the video data (408), the DPU (402) applies the video data to the data analytics model(s) of the video processing engine (not shown) of the DPU (402) to generate video data chunks (410) and indexing attributes (412) [2]. The video data chunks (410) includes video data chunk A (410A) and video data chunk B (410B). The indexing attributes (412) include person A (412A) and person B (412B). Following the generation of the video data chunks (410) and the indexing attributes (412), the DPU (402) generates indexing metadata (416) based on the video data chunks (410) and the indexing attributes (412) [3]. The indexing metadata (416) includes stream ID A (418A) and information associated with both video data chunks (410A, 410B). The information associated with video data chunk A (410A) includes video data chunk ID A (420A), start time A (422A), and end time A (424A). The information associated with video data chunk B (410B) includes video data chunk ID B (420B), start time B (422B), and end time B (424B).

After the generation of the indexing metadata (416), the DPU (402) applies the context generation models of the context generator (not shown) to the video data chunks (410A, 410B) and the indexing attributes (412A, 412B) to generate the contextual attributes (414) [4]. The context generation model(s) determine that person A (412A) appears happy and person B (412B) appears nervous, and therefore, generates the contextual attributes (414), which include happy (414A) and nervous (414B). The DPU (402) then generates contextual metadata (426) using the contextual attributes (414), the indexing attributes (412) and the video data chunks (410) [5]. The contextual metadata (426) includes the indexing attributes (412) associated with their corresponding contextual attributes (414). Accordingly, person A (412A) is associated with happy (414A) and person B (412B) is associated with nervous (414B).

Then, the DPU (402) associates the indexing metadata (416) and the contextual metadata (426) with the video data chunks (410A, 410B) by associating the video data chunk IDs (420A, 420B) with the indexing attributes (412A, 412B) with which they are associated [6]. In this example, person A (412A) appears in video data chunk A (410A) and is associated with video data chunks ID A (420A), and person B (412B) appears in video data chunk B (410B) and is associated in video data chunk ID B (420B). Finally, the DPU (402) sends the video data chunks (410A, 410B) and copies of portions of the indexing metadata (416) to the backup storage (430), where video data chunks (410A, 410B) and the copies of portions of the indexing metadata (416) are stored in primary storage (432) as processed primary storage video data (434), and the indexing metadata (416) and contextual metadata (426) are stored in edge persistent storage (404) [7]. The processed primary storage video data (434) includes video data chunk A (410A), the copies of portions of the indexing metadata associated with video data chunk A (410A) (i.e., video data chunk ID A (420A), start time A (422A), and end time A (424A)), video data chunk B (410B), and the copies of portions of indexing metadata associated with video data chunk B (410B) (i.e., video data chunk ID B (420B), start time B (422B), and end time B (424B)).

Figure 5A:
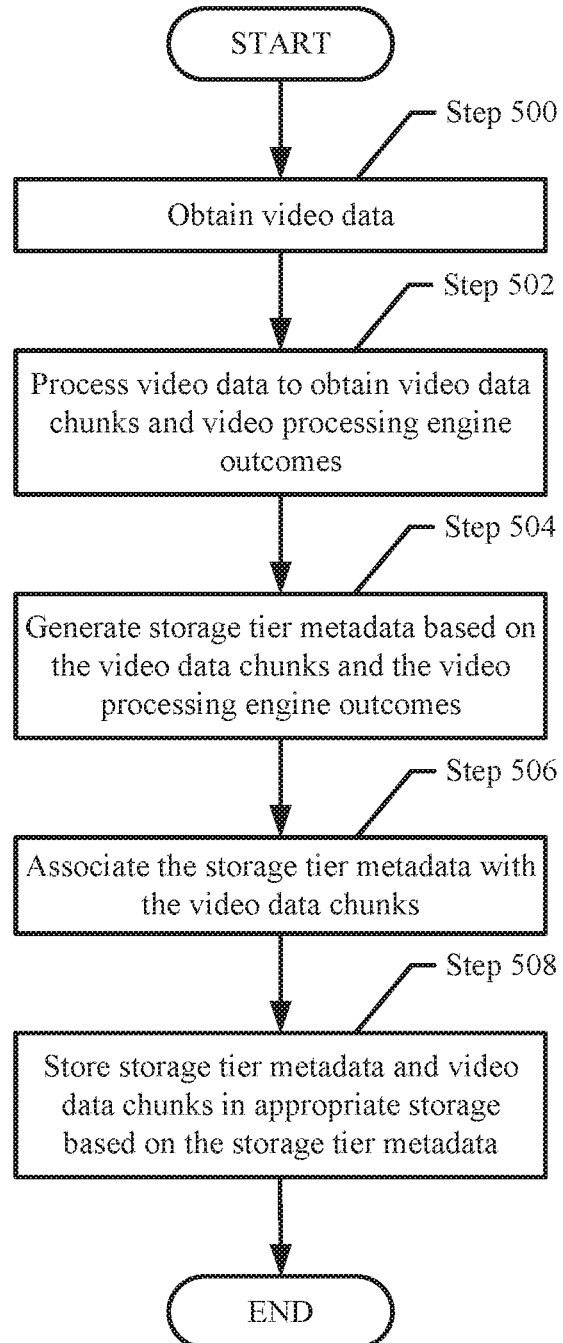
FIG. 5A shows a flowchart of a method for performing storage tier operation on video data in accordance with one or more embodiments of the invention.

FIG. 5A shows a flowchart of a method for performing a storage tier operation in accordance with one or more embodiments of the invention. The method shown in FIG. 5A may be performed by, for example, a DPU (e.g., 104, FIG. 1B) of an edge device. Other components of the system illustrated in FIG. 1A may perform all, or a portion, of the method of FIG. 5A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 500, video data is obtained. In one or more embodiments of the invention, the video data is obtained from a video camera. The video camera may send a message to the peripheral interface of the edge device through the local connection. The message may include a video file. The video file may include video data. The video file may include other and/or additional data without departing from the invention. The peripheral interface may provide the video data to the DPU. The video data may be obtained via other and/or additional methods without departing from the invention.

In another embodiment of the invention, a video camera streams the video data to the peripheral interface of the edge device. In other words, the video camera transmits the video data through the local connection to the peripheral device as a steady, continuous flow. The peripheral device may provide the video data to the DPU. The video data may be obtained via other and/or additional methods without departing from the invention.

In step 502, the video data is processed to obtain video data chunks and video processing engine outcomes. In one or more embodiments of the invention, the DPU applies data analytics model(s) (discussed above) of the video processing engine to the video data. The data analytics model(s) may generate one or more video processing engine outcomes associated with the video data. The video processing engine outcomes may include, for example, facial recognition, fraud detection, and other and/or additional video processing engine outcomes as discussed above. The data analytics model(s) may break up the video data into video data chunks associated with the one or more video processing engine outcome. Each video processing engine outcome may be associated with one or more video data chunks and each video data chunk may be associated with one or more video processing engine outcomes. The data analytics model(s) may generate any number of video processing engine outcomes and divide the video data into any number of video data chunks without departing from the invention. The video data may be processed to obtain video data chunks and video processing engine outcomes via other and/or additional methods without departing from the invention.

In step 504, storage tier metadata is generated based on the video data chunks and the video processing engine outcomes. In one or more embodiments of the invention, the DPU generates storage tier metadata using the video data chunks and the video processing engine outcomes. The DPU may generate or update a video stream metadata entry. The DPU may include storage tier metadata in the video stream metadata entry. The DPU may generate and include storage tier identifiers associated with the video data chunks in the storage tier metadata. The DPU may include a storage tier assignment policies obtained from a user of the system. The storage tier assignment policies may include storage tier requirements for the one or more video processing engine outcomes. The storage tier requirements may specify a storage type (e.g., primary storage, secondary storage, archival storage) of the backup storage to store a video data chunk associated with a given video processing engine outcome. The DPU may compare the video processing engine outcomes associated with the video data chunks with the video processing engine outcomes included in the storage tier assignment policies and include storage tier identifiers associated with storage types in the storage tier metadata based on the comparisons. The storage tier metadata may be generated based on the video data chunks and the video processing engine outcomes via other and/or additional methods without departing from the invention.

In step 506, the storage tier metadata is associated with the video data chunks. In one or more embodiments of the invention, the DPU updates the video stream metadata entry associated with the video data chunks to associate the storage tier metadata with the video data chunks. The DPU may associate the video data chunk identifiers associated with each video data chunk with each storage tier identifier included in the storage tier metadata. For example, the DPU may associate the video data chunk identifier associated with a first video data chunk with the storage tier identifier associated with the first video data chunk. The storage tier metadata may be associated with the video data chunks via other and/or additional methods without departing from the invention.

In step 508, the storage tier metadata and video data chunks are stored in appropriate storage based on the storage tier metadata. In one or more embodiments of the invention, the DPU stores the storage tier metadata in the edge persistent storage of the edge device and the video data chunks in a backup storage. The DPU may also generate copies of the storage tier metadata and include the copies with the video data chunks stored in the backup storage. The DPU may send a message to the backup storage through the non-local connection. The message may include the video data chunks, the copies of the storage tier metadata, and a request to store the video data chunks, and the copies of the storage tier metadata in the appropriate storages of the backup storage. In response to obtaining the message, the backup storage may store each of the video data chunks and the copies of storage tier metadata associated with each video data chunk in the appropriate storage based on the storage tier metadata. The storage tier metadata and the video data chunks may be stored in appropriate storages based on the storage tier metadata via other and/or additional methods without departing from the invention.

The method may end following step 508.

Figure 5B:
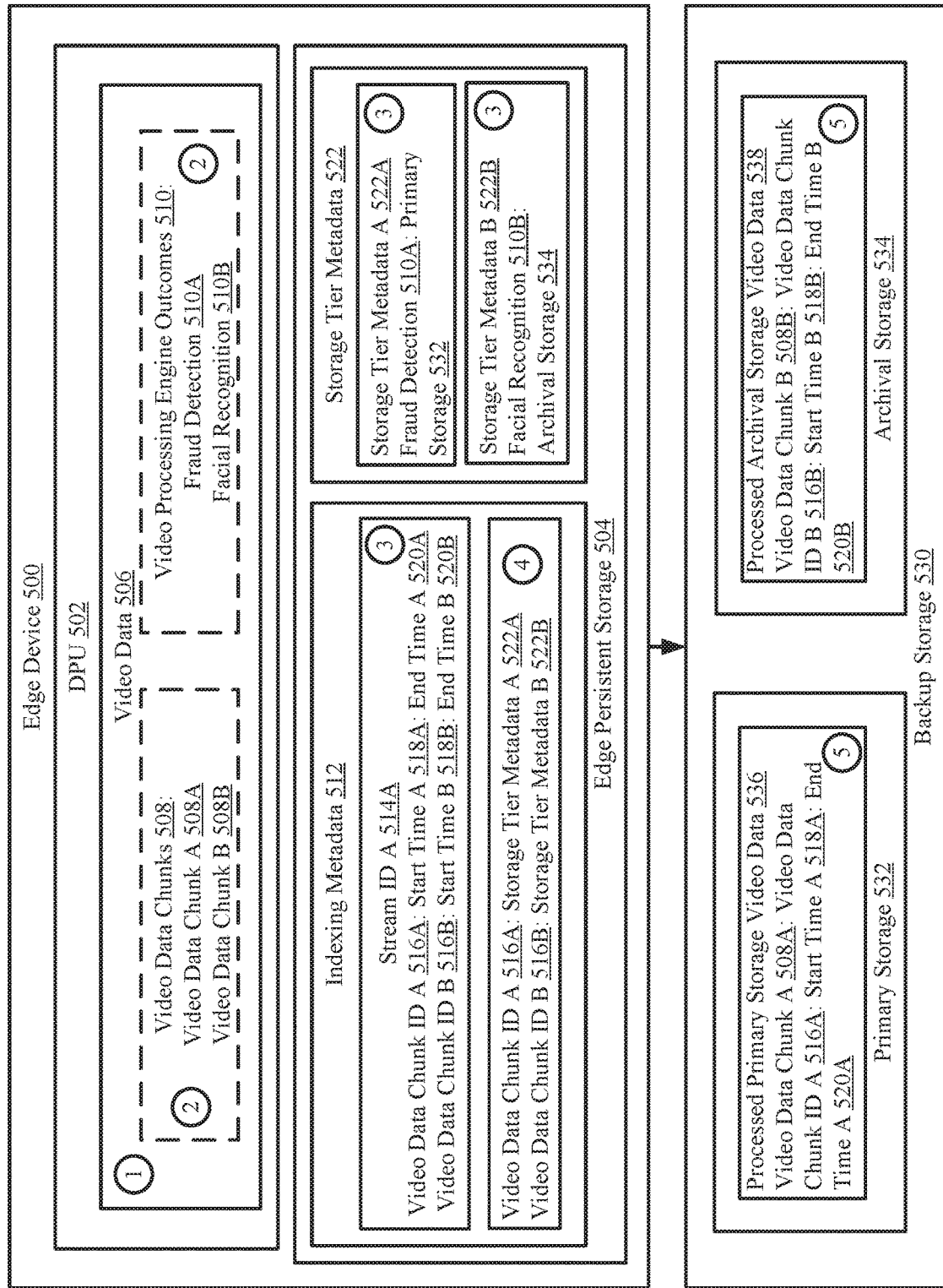
FIG. 5B shows a diagram of a third example in accordance with one or more embodiments of the invention.

FIG. 5B shows a diagram of a third example in accordance with one or more embodiments of the invention. The example depicted in FIG. 5B may depict a storage tier operation. The example is not intended to limit the scope of the invention. The example system depicted in FIG. 5B may include fewer components than the systems depicted in FIGS. 1A-1C for the sake of brevity.

Turning to the example, consider a scenario in which a video camera (not shown) provides video data to an edge device (500). The edge device (500) includes a DPU (502) and edge persistent storage (504).

Initially, the DPU (502) obtains video data (506) from a video camera (not shown) [1]. After obtaining the video data (506), the DPU (502) applies the video data to the data analytics models of the video processing engine (not shown) of the DPU (502) to generate video data chunks (508) and video processing engine outcomes (510) [2]. The video data chunks (508) includes video data chunk A (508A) and video data chunk B (508B). The video processing engine outcomes (510) include fraud detection (510A) and facial recognition (510B). Following the generation of the video data chunks (508) and the video processing engine outcomes (510), the DPU (502) generates indexing metadata (512) and storage tier metadata (522) based on the video data chunks (506) and the video processing engine outcomes (510) [3]. The indexing metadata (512) includes stream ID A (514A) and information associated with both video data chunks (508A, 508B). The information associated with video data chunk A (508A) includes video data chunk ID A (516A), start time A (518A), and end time A (520A). The information associated with video data chunk B (508B) includes video data chunk ID B (516B), start time B (518B), and end time B (520B). The storage tier metadata (522) includes storage tier metadata A (522A) and storage tier metadata B (522B). Storage tier metadata A (522A) specifies that fraud detection (510A) is to be stored in primary storage (532), and storage tier metadata B (522B) specifies that facial recognition (510B) is to be stored in archival storage (534).

Then, the DPU (502) associates the indexing metadata (512) and the storage tier metadata (522) with the video data chunks (508) by associating the video data chunk IDs (516A, 516B) with each storage metadata (522A, 522B) [4]. In this example, fraud detection (510A) occurs in video data chunk A (508A) and is associated with video data chunk ID A (516A), and facial recognition (510B) occurs in video data chunk B (508B) and is associated in video data chunk ID B (516B). Finally, the DPU (502) sends the video data chunks (508A, 508B) and copies of portions of the indexing metadata (512) and storage tier metadata (522) to the backup storage (530). Based on storage tier metadata A (522A), video data chunk A (508A) and indexing metadata associated with video data chunk A (508A) are stored in primary storage (532) as processed primary storage video data (536), and based on storage tier metadata B (522B), video data chunk B (508B) and indexing metadata (512) associated with video data chunk B (508B) are stored in archival storage (534) as processed archival storage video data (538) [5]. The processed primary storage video data (536) includes video data chunk A (508A) and the copies of portions of the indexing metadata associated with video data chunk A (508A) (i.e., video data chunk ID A (516A), start time A (518A), and end time A (520A)). The processed archival storage video data (538) includes video data chunk B (508B) and the copies of portions of indexing metadata associated with video data chunk B (506B) (i.e., video data chunk ID B (516B), start time B (518B), and end time B (520B)).

Figure 6A:
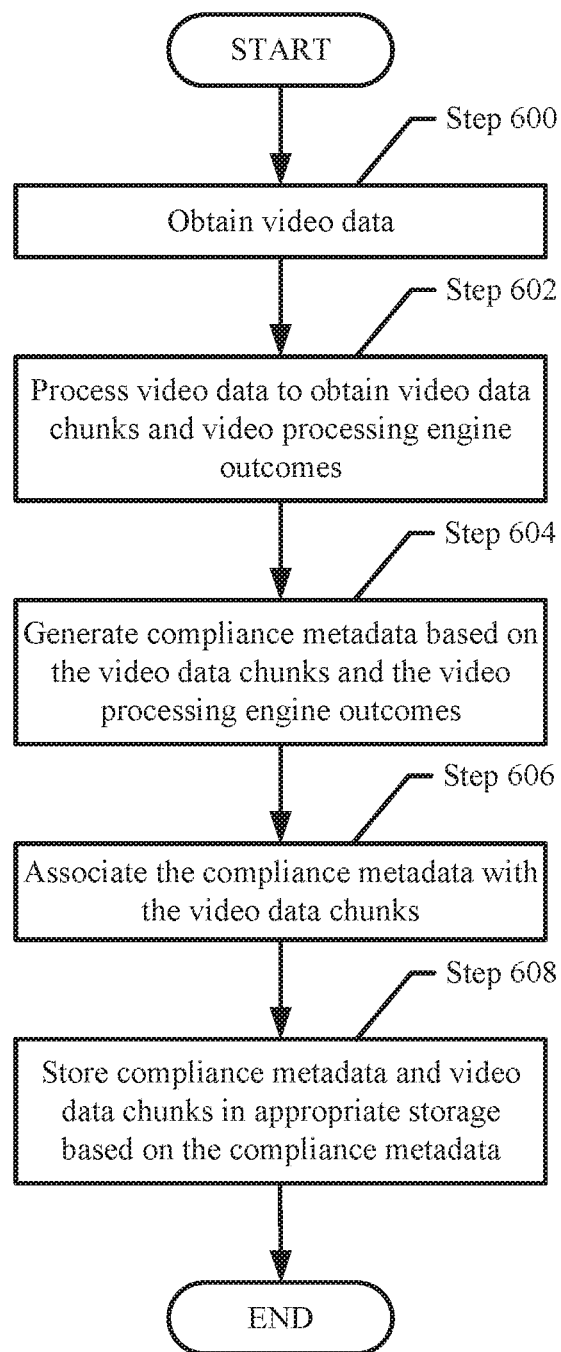
FIG. 6A shows a flowchart of a method for performing a compliance operation on video data in accordance with one or more embodiments of the invention.

FIG. 6A shows a flowchart of a method for performing a compliance operation in accordance with one or more embodiments of the invention. The method shown in FIG. 6A may be performed by, for example, a DPU (e.g., 104, FIG. 1B) of an edge device. Other components of the system illustrated in FIG. 1A may perform all, or a portion, of the method of FIG. 6A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 600, video data is obtained. In one or more embodiments of the invention, the video data is obtained from a video camera. The video camera may send a message to the peripheral interface of the edge device through the local connection. The message may include a video file. The video file may include video data. The video file may include other and/or additional data without departing from the invention. The peripheral interface may provide the video data to the DPU. The video data may be obtained via other and/or additional methods without departing from the invention.

In another embodiment of the invention, a video camera streams the video data to the peripheral interface of the edge device. In other words, the video camera transmits the video data through the local connection to the peripheral device as a steady, continuous flow. The peripheral device may provide the video data to the DPU. The video data may be obtained via other and/or additional methods without departing from the invention.

In step 602, the video data is processed to obtain video data chunks and video processing engine outcomes. In one or more embodiments of the invention, the DPU applies data analytics model(s) (discussed above) of the video processing engine to the video data. The data analytics model(s) may generate one or more video processing engine outcomes associated with the video data. The video processing engine outcomes may include, for example, facial recognition, fraud detection, and other and/or additional video processing engine outcomes as discussed above. The data analytics model(s) may break up the video data into video data chunks associated with the one or more video processing engine outcome. Each video processing engine outcome may be associated with one or more video data chunks and each video data chunk may be associated with one or more video processing engine outcomes. The data analytics model(s) may generate any number of video processing engine outcomes and divide the video data into any number of video data chunks without departing from the invention. The video data may be processed to obtain video data chunks and video processing engine outcomes via other and/or additional methods without departing from the invention.

In step 604, compliance metadata is generated based on the video data chunks and the video processing engine outcomes. In one or more embodiments of the invention, the DPU generates compliance metadata using the video data chunks and the video processing engine outcomes. The DPU may generate or update a video stream metadata entry. The DPU may include compliance metadata in the video stream metadata entry. The DPU may generate and include compliance information (discussed above) associated with the video data chunks in the compliance metadata. The DPU may include compliance policies obtained from a user of the system. The compliance policies may include compliance requirements for the video data chunks associated with the one or more video processing engine outcomes and the video processing engine outcomes associated with each compliance requirement. The compliance requirements may specify a geographic storage location, organizational requirements, industry requirements, and/or other and or additional types of compliance requirements without departing from the invention. The DPU may compare the video processing engine outcomes associated with the video data chunks with the video processing engine outcomes included in the compliance policies and include compliance information associated with the compliance requirements in the compliance metadata based on the comparisons. The compliance metadata may be generated based on the video data chunks and the video processing engine outcomes via other and/or additional methods without departing from the invention.

In step 606, the compliance metadata is associated with the video data chunks. In one or more embodiments of the invention, the DPU updates the video stream metadata entry associated with the video data chunks to associate the compliance metadata with the video data chunks. The DPU may associate the video data chunk identifiers associated with each video data chunk with each compliance requirement included in the compliance metadata. For example, the DPU may associate the video data chunk identifier associated with a first video data chunk with a first compliance requirement associated with the first video data chunk. The compliance metadata may be associated with the video data chunks via other and/or additional methods without departing from the invention.

In step 608, the compliance metadata and video data chunks are stored in appropriate storage based on the compliance metadata. In one or more embodiments of the invention, the DPU stores the compliance metadata in the edge persistent storage of the edge device and the video data chunks in a backup storage. The DPU may also generate copies of the compliance metadata and include the copies with the video data chunks stored in the backup storage. The DPU may send a message to the backup storage through the non-local connection. The message may include the video data chunks, the copies of the compliance metadata, and a request to store the video data chunks and the copies of the compliance metadata in the appropriate storages of the backup storage. In response to obtaining the message, the backup storage may store each of the video data chunks and the copies of compliance metadata associated with each video data chunk in the appropriate storage based on the compliance metadata. The compliance metadata and the video data chunks may be stored in appropriate storages based on the compliance metadata via other and/or additional methods without departing from the invention.

As a result, the compliance metadata may be used by the DPU to verify that further operations performed on video data chunks are in accordance with video data compliance requirements specified in the compliance metadata. For example, retention and staging metadata may specify that a video data chunk is to be deleted from a backup storage after one year. However, the compliance metadata associated with the video chunk may specify a compliance requirement that indicates the video data chunk is not to be deleted before three years of being stored in the backup storage. The DPU may check the compliance metadata associated with the video data chunk prior to deleting the video data chunk to determine whether the compliance metadata allows for the deletion of the video data chunk following a year of being stored in the backup storage, and determine not to delete the video data chunk.

Turning to another example, during a long term stitching operation, the DPU may check with the compliance metadata associated with a video data chunk to determine a backup storage to de-stage the video data chunk to. The compliance metadata may indicate that the video data chunk was generated in North America and must be stored in a data center located in North America. The DPU may identify two data centers in which the video data chunk may be de-staged to, where the first data center is in North America and the second is in Asia. The DPU may determine to de-stage the video data chunk to the video data center located in North America based on the compliance metadata associated with the video data chunk.

The method may end following step 608.

Figure 6B:
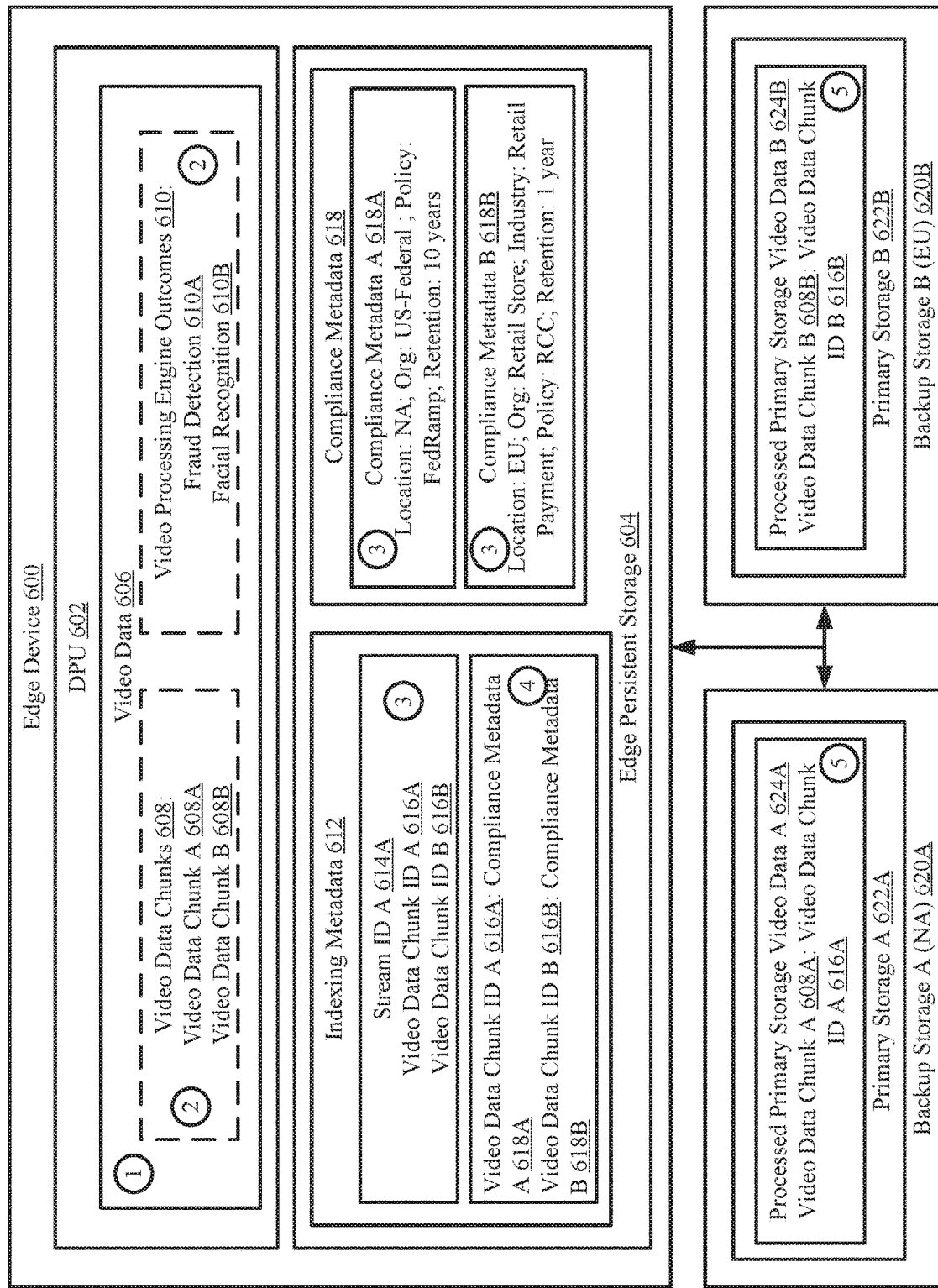
FIG. 6B shows a diagram of a fourth example in accordance with one or more embodiments of the invention.

FIG. 6B shows a diagram of a fourth example in accordance with one or more embodiments of the invention. The example depicted in FIG. 6B may depict a compliance operation. The example is not intended to limit the scope of the invention. The example system depicted in FIG. 6B may include fewer components than the systems depicted in FIGS. 1A-1C for the sake of brevity.

Turning to the example, consider a scenario in which a video camera (not shown) provides video data to an edge device (600). The edge device (600) includes a DPU (602) and edge persistent storage (604).

Initially, the DPU (602) obtains video data (606) from a video camera (not shown) [1]. After obtaining the video data (606), the DPU (602) applies the video data to the data analytics models of the video processing engine (not shown) of the DPU (602) to generate video data chunks (608) and video processing engine outcomes (610) [2]. The video data chunks (608) includes video data chunk A (608A) and video data chunk B (608B). The video processing engine outcomes (610) include fraud detection (610A) and facial recognition (610B). Following the generation of the video data chunks (608) and the video processing engine outcomes (610), the DPU (602) generates indexing metadata (612) and compliance metadata (618) based on the video data chunks (606) and the video processing engine outcomes (610) [3]. The indexing metadata (612) includes stream IDA (614A) and information associated with both video data chunks (608A, 608B). The information associated with video data chunk A (608A) includes video data chunk ID A (616A). The information associated with video data chunk B (608B) includes video data chunk ID B (616B). The compliance metadata (618) includes compliance metadata A (618A) and compliance metadata B (618B). Compliance metadata A (618A) includes compliance information associated with video data chunk A (608A). The compliance information specifies that video data chunk A (608A) is to be located in North America, is associated with a US federal organization, is to follow the FedRAMP policy, and is to include a retention period of ten years. Compliance metadata B (618B) includes compliance information associated with video data chunk B (608B). The compliance information specifies that video data chunk B (608B) is to be located in the European Union, is associated with a retail store organization, is associated with the retail payment industry, is to follow the PCI DSS policy, and is to include a retention period of one year.

Then, the DPU (602) associates the indexing metadata (612) and the compliance metadata (618) with the video data chunks (608) by associating the video data chunk IDs (616A, 616B) with each compliance metadata (618A, 618B) [4]. In this example, fraud detection (610A) in a US federal organization occurs in video data chunk A (608A) and is associated with video data chunks ID A (616A), and facial recognition (610B) of an EU retail store occurs in video data chunk B (608B) and is associated in video data chunk ID B (616B). Finally, the DPU (602) sends the video data chunks (608A, 608B) and copies of portions of the indexing metadata (612) and compliance metadata (618) to backup storage A (620A) and backup storage B (620B). Based on compliance metadata A (618A), video data chunk A (608A) and indexing metadata associated with video data chunk A (608A) are stored in primary storage A (622A) of backup storage A (620A) as processed primary storage video data A (624A) because backup storage A (620A) is located in North America and compliance metadata A (618A) specifies that video data chunk A (608A) is to be stored in North America. Based on compliance metadata B (618B), video data chunk B (608B) and indexing metadata associated with video data chunk B (608B) are stored in primary storage B (622B) of backup storage B (620B) as processed primary storage video data B (624B) because backup storage B (620B) is located in the European Union and compliance metadata B (618B) specifies that video data chunk B (608A) is to be stored in the European Union [5]. The processed primary storage video data A (624A) includes video data chunk A (608A) and the copies of the indexing metadata associated with video data chunk A (608A) (i.e., video data chunk ID A (616A)). The processed primary storage video data B (624B) includes video data chunk B (608B), and the copies of indexing metadata associated with video data chunk B (608B) (i.e., video data chunk ID B (616B)).

Figure 7A:
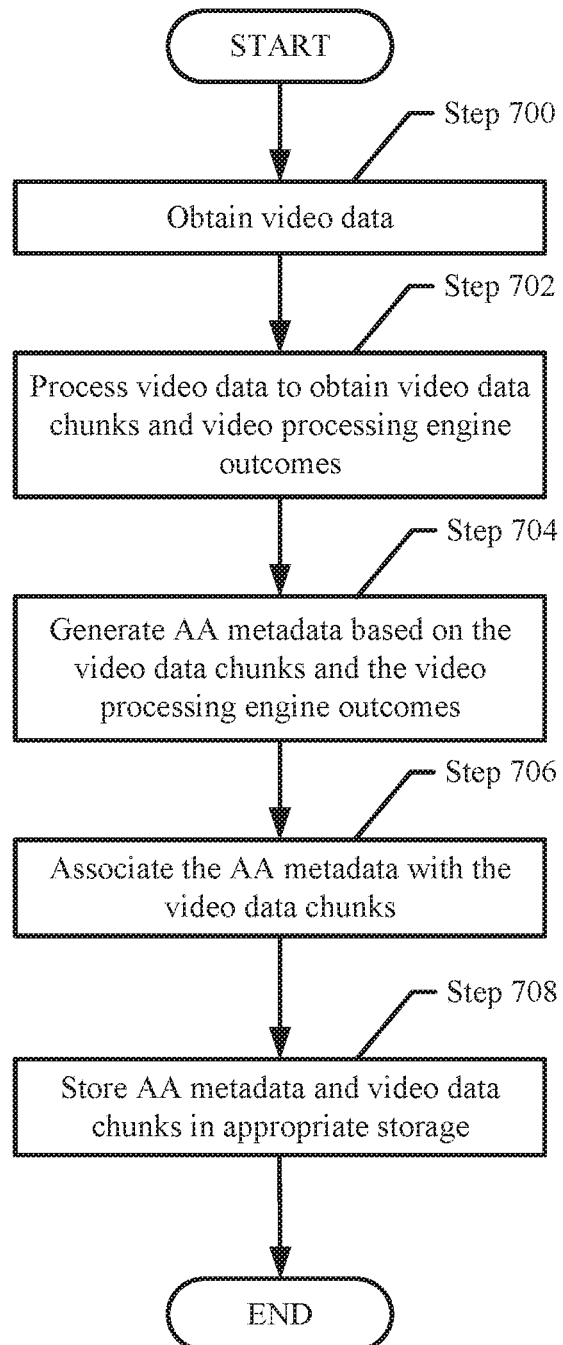
FIG. 7A shows a flowchart of a method for performing an authentication and authorization operation on video data in accordance with one or more embodiments of the invention.

FIG. 7A shows a flowchart of a method for performing an authentication and authorization operation in accordance with one or more embodiments of the invention. The method shown in FIG. 7A may be performed by, for example, a DPU (e.g., 104, FIG. 1B) of an edge device. Other components of the system illustrated in FIG. 1A may perform all, or a portion, of the method of FIG. 7A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 700, video data is obtained. In one or more embodiments of the invention, the video data is obtained from a video camera. The video camera may send a message to the peripheral interface of the edge device through the local connection. The message may include a video file. The video file may include video data. The video file may include other and/or additional data without departing from the invention. The peripheral interface may provide the video data to the DPU. The video data may be obtained via other and/or additional methods without departing from the invention.

In another embodiment of the invention, a video camera streams the video data to the peripheral interface of the edge device. In other words, the video camera transmits the video data through the local connection to the peripheral device as a steady, continuous flow. The peripheral device may provide the video data to the DPU. The video data may be obtained via other and/or additional methods without departing from the invention.

In step 702, the video data is processed to obtain video data chunks and video processing engine outcomes. In one or more embodiments of the invention, the DPU applies data analytics model(s) (discussed above) of the video processing engine to the video data. The data analytics model(s) may generate one or more video processing engine outcomes associated with the video data. The video processing engine outcomes may include, for example, facial recognition, fraud detection, and other and/or additional video processing engine outcomes as discussed above. The data analytics model(s) may break up the video data into video data chunks associated with the one or more video processing engine outcome. Each video processing engine outcome may be associated with one or more video data chunks and each video data chunk may be associated with one or more video processing engine outcomes. The data analytics model(s) may generate any number of video processing engine outcomes and divide the video data into any number of video data chunks without departing from the invention. The video data may be processed to obtain video data chunks and video processing engine outcomes via other and/or additional methods without departing from the invention.

In step 704, AA metadata is generated based on the video data chunks and the video processing engine outcomes. In one or more embodiments of the invention, the DPU generates compliance metadata using the video data chunks and the video processing engine outcomes. The DPU may generate or update a video stream metadata entry. The DPU may include AA metadata in the video stream metadata entry. The DPU may generate and include authentication and authorization information (discussed above) associated with the video data chunks in the AA metadata. The DPU may include authentication and authorization policies obtained from a user of the system. The authentication and authorization policies may include authentication and authorization information for the video data chunks associated with the one or more video processing engine outcomes and the video processing engine outcomes associated with each authentication and authorization information. The authentication and authorization information may specify which users include access to the video data chunks and the type of access associated with each user. The DPU may compare the video processing engine outcomes associated with the video data chunks with the video processing engine outcomes included in the authentication and authorization policies and include authentication and authorization information in the AA metadata based on the comparisons. The AA metadata may be generated based on the video data chunks and the video processing engine outcomes via other and/or additional methods without departing from the invention.

Additionally, the DPU may generate AA metadata associated with the video data chunks based on the video processing engine outcomes. The video processing engine outcomes may be associated with negative connotations. Negative connotations may include any action or characteristic of a subject of video data that may be considered bad, illegal, and/or fraudulent in any way without departing from the invention. The DPU may generate AA metadata for video data chunks associated with negative connotations. The AA metadata may specify the video data chunks associated with the negative connotations are placed under legal hold. The AA metadata may be generated based on the video data chunks and the video processing engine outcomes via other and/or additional methods without departing from the invention.

In step 706, the AA metadata is associated with the video data chunks. In one or more embodiments of the invention, the DPU updates the video stream metadata entry associated with the video data chunks to associate the AA metadata with the video data chunks. The DPU may associate the video data chunk identifiers associated with each video data chunk with each authentication and authorization information included in the AA metadata. For example, the DPU may associate the video data chunk identifier associated with a first video data chunk with a first set of authentication and authorization information associated with the first video data chunk. The AA metadata may be associated with the video data chunks via other and/or additional methods without departing from the invention.

In step 708, the AA metadata and video data chunks are stored in storage. In one or more embodiments of the invention, the DPU stores the AA metadata and in the edge persistent storage of the edge device and the video data chunks in a backup storage. The DPU may also generate copies of all, or a portion, of the AA metadata and include the copies of the AA metadata with the video data chunks stored in the backup storage. The DPU may send a message to the backup storage through the non-local connection. The message may include the video data chunks, the copies of the AA metadata, and a request to store the video data chunks and the copies of AA metadata in the backup storage. In response to obtaining the message, the backup storage may store the video data chunks and the copies of AA metadata and in persistent storage. The AA metadata and the video data chunks may be stored via other and/or additional methods without departing from the invention.

As a result, video data chunks stored with AA metadata that indicates the video data chunks are under legal hold may not be deleted while under legal hold. For example, a video data chunk may be associated with AA metadata that is placed under legal hold. A deletion request may be obtained by the DPU associated with the video data chunk. The DPU may check the AA metadata associated with the video data chunk, and determine to reject the deletion request because the AA metadata indicates that the video data chunk is under legal hold. If the AA metadata indicates that video data chunks are not under legal hold, the DPU may perform any operation on the video data chunks (e.g., delete the video data chunks) without the AA metadata associated with the video data chunks.

The method may end following step 708.

Figure 7B:
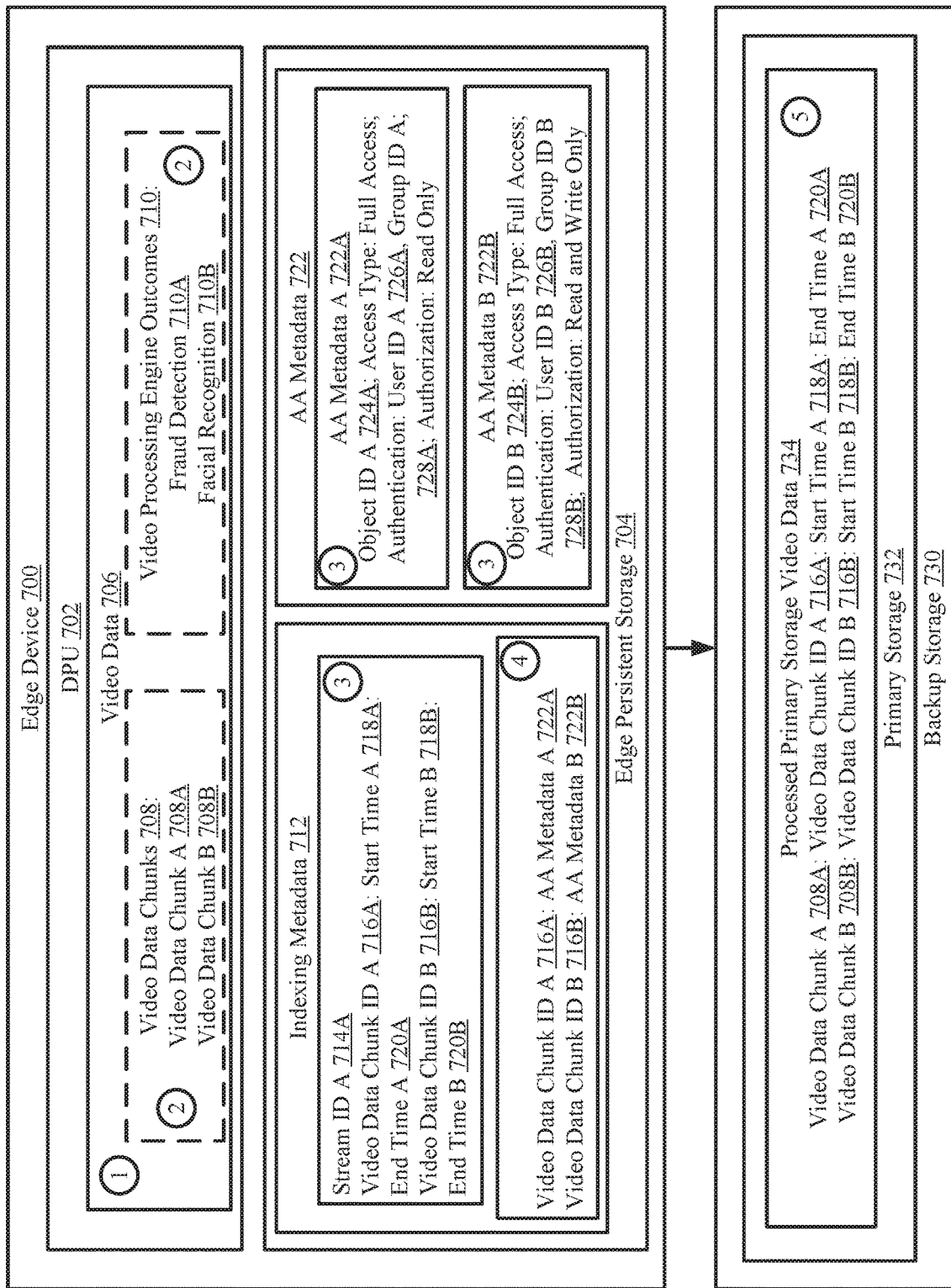
FIG. 7B shows a diagram of a fifth example in accordance with one or more embodiments of the invention.

FIG. 7B shows a diagram of a fifth example in accordance with one or more embodiments of the invention. The example depicted in FIG. 7B may depict an authentication and authorization operation. The example is not intended to limit the scope of the invention. The example system depicted in FIG. 7B may include fewer components than the systems depicted in FIGS. 1A-1C for the sake of brevity.

Turning to the example, consider a scenario in which a video camera (not shown) provides video data to an edge device (700). The edge device (700) includes a DPU (702) and edge persistent storage (704).

Initially, the DPU (702) obtains video data (706) from a video camera (not shown) [1]. After obtaining the video data (706), the DPU (702) applies the video data to the data analytics models of the video processing engine (not shown) of the DPU (702) to generate video data chunks (708) and video processing engine outcomes (710) [2]. The video data chunks (708) includes video data chunk A (708A) and video data chunk B (708B). The video processing engine outcomes (710) include fraud detection (710A) and facial recognition (710B). Following the generation of the video data chunks (708) and the video processing engine outcomes (710), the DPU (702) generates indexing metadata (712) and AA metadata (722) based on the video data chunks (708) and the video processing engine outcomes (710) [3]. The indexing metadata (712) includes stream ID A (714A) and information associated with both video data chunks (708A, 708B). The information associated with video data chunk A (708A) includes video data chunk ID A (716A), start time A (718A), and end time A (720A). The information associated with video data chunk B (708B) includes video data chunk ID B (716B) start time B (718B), and end time B (720B). The AA metadata (722) includes AA metadata A (722A) and AA metadata B (722B). AA metadata A (722A) includes authentication and authorization information associated with video data chunk A (708A). The authentication and authorization information specifies that video data chunk A (708A) is associated with object ID A (724A), users associated with the AA metadata have full access, users with user ID A (726A) and/or group ID A (728A) may access video data chunk A (708A), and users are authorized to only read video data chunk A (708A). AA metadata B (722B) includes authentication and authorization information associated with video data chunk B (708B). The authentication and authorization information specifies that video data chunk B (708B) is associated with object ID B (724B), users associated with the AA metadata have full access, users with user ID B (726B) and/or group ID B (728B) may access video data chunk B (708B), and users are authorized to read and write to video data chunk B (708B).

Then, the DPU (702) associates the indexing metadata (712) and the AA metadata (722) with the video data chunks (708) by associating the video data chunk IDs (716A, 716B) with each AA metadata (722A, 722B) [4]. In this example, fraud detection (710A), which is associated with user ID A (726A) and group ID A (728B), occurs in video data chunk A (708A) and is associated with video data chunks ID A (716A), and facial recognition (710B), which is associated with user ID A (726A) and group ID A (728B), occurs in video data chunk B (708B) and is associated in video data chunk ID B (716B). Finally, the DPU (702) sends the video data chunks (708A, 708B) and copies of portions of the indexing metadata (712) and AA metadata (722) to the backup storage (730) and are stored in primary storage (732) as processed primary storage video data (734). The processed primary storage video data (734) includes video data chunk A (708A), video data chunk ID A (716A), start time A (718A), end time A (720A), video data chunk B (708B), video data chunk ID B (716B), start time B (718B), and end time B (720B).

Figure 8A:
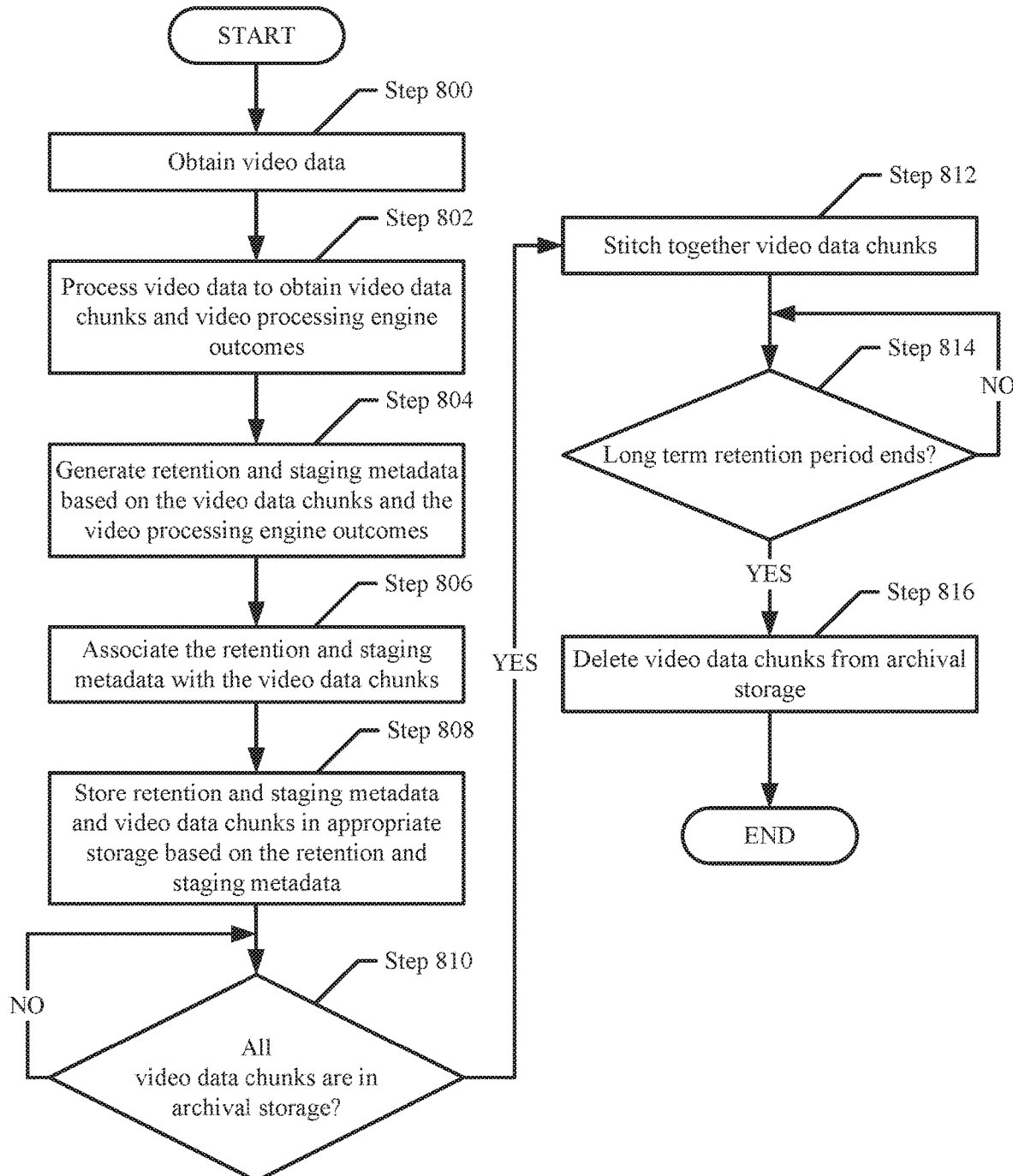
FIG. 8A shows a flowchart of a method for performing a long term stitching operation on video data in accordance with one or more embodiments of the invention.

FIG. 8A shows a flowchart of method for performing a long term stitching operation in accordance with one or more embodiments of the invention. The method shown in FIG. 8A may be performed by, for example, a DPU (e.g., 104, FIG. 1B) of an edge device. Other components of the system illustrated in FIG. 1A may perform all, or a portion, of the method of FIG. 8A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 800, video data is obtained. In one or more embodiments of the invention, the video data is obtained from a video camera. The video camera may send a message to the peripheral interface of the edge device through the local connection. The message may include a video file. The video file may include video data. The video file may include other and/or additional data without departing from the invention. The peripheral interface may provide the video data to the DPU. The video data may be obtained via other and/or additional methods without departing from the invention.

In another embodiment of the invention, a video camera streams the video data to the peripheral interface of the edge device. In other words, the video camera transmits the video data through the local connection to the peripheral device as a steady, continuous flow. The peripheral device may provide the video data to the DPU. The video data may be obtained via other and/or additional methods without departing from the invention.

In step 802, the video data is processed to obtain video data chunks and video processing engine outcomes. In one or more embodiments of the invention, the DPU applies data analytics model(s) (discussed above) of the video processing engine to the video data. The data analytics model(s) may generate one or more video processing engine outcomes associated with the video data. The video processing engine outcomes may include, for example, facial recognition, fraud detection, and other and/or additional video processing engine outcomes as discussed above. The data analytics model(s) may break up the video data into video data chunks associated with the one or more video processing engine outcome. Each video processing engine outcome may be associated with one or more video data chunks and each video data chunk may be associated with one or more video processing engine outcomes. The data analytics model(s) may generate any number of video processing engine outcomes and divide the video data into any number of video data chunks without departing from the invention. The video data may be processed to obtain video data chunks and video processing engine outcomes via other and/or additional methods without departing from the invention.

In step 804, retention and staging metadata is generated based on the video data chunks and the video processing engine outcomes. In one or more embodiments of the invention, the DPU generates retention and staging metadata using the video data chunks and the video processing engine outcomes. The DPU may generate or update a video stream metadata entry. The DPU may include retention and staging metadata in the video stream metadata entry. The DPU may generate and include retention and staging information (discussed above) associated with the video data chunks in the retention and staging metadata. The DPU may include retention and staging policies obtained from a user of the system. The retention and staging policies may include retention periods and staging information for the video data chunks associated with the one or more video processing engine outcomes and the video processing engine outcomes associated with each retention period and staging information. The DPU may compare the video processing engine outcomes associated with the video data chunks with the video processing engine outcomes included in the retention and staging policies and include retention periods and staging information in the retention and staging metadata based on the comparisons. The retention and staging metadata may be generated based on the video data chunks and the video processing engine outcomes via other and/or additional methods without departing from the invention.

In step 806, the retention and staging metadata is associated with the video data chunks. In one or more embodiments of the invention, the DPU updates the video stream metadata entry associated with the video data chunks to associate the retention and staging metadata with the video data chunks. The DPU may associate the video data chunk identifiers associated with each video data chunk with each retention period and staging information included in the retention and staging metadata. For example, the DPU may associate the video data chunk identifier associated with a first video data chunk with a first retention period and set staging information associated with the first video data chunk. The retention and staging metadata may be associated with the video data chunks via other and/or additional methods without departing from the invention.

In step 808, the retention and staging metadata and video data chunks are stored in storage based on the retention and staging metadata. In one or more embodiments of the invention, the DPU stores the retention and staging metadata in the edge persistent storage of the edge device and the video data chunks in a backup storage. The DPU may also generate copies of the retention and staging metadata and include the copies or the retention and staging metadata with the video data chunks stored in the backup storage. The DPU may send a message to the backup storage through the non-local connection. The message may include the video data chunks, the copies of the retention and staging metadata, and a request to store the video data chunks and the copies of the retention metadata in the appropriate storages (i.e., primary storage, secondary storage, and/or archival storage) of the backup storage. In response to obtaining the message, the backup storage may store each of the video data chunks and the copies of retention and staging metadata associated with each video data chunk in the appropriate storage based on the retention metadata. The retention and staging metadata and the video data chunks may be stored in appropriate storages based on the retention and staging metadata via other and/or additional methods without departing from the invention.

In step 810, a determination is made as to whether all video data chunks are in archival storage. In one or more embodiments of the invention, each video data chunk stored in the backup storage is de-staged to archival storage at some period of time as discussed above. The backup manager of the backup storage may include the retention and staging metadata, and may de-stage the video data chunks to the archival storage according to the retention and staging metadata, which may specify all of the video data chunks in a video stream. The backup manager may monitor the retention and staging metadata and the video data chunks stored in archival storage, and when all video data chunks of a video stream are de-staged to archival storage, the backup manager of the backup storage may send a notification to the DPU. The notification may include a message that includes a request to stitch together the video data chunks. The DPU may wait any amount of time for the notification from the backup manager of the backup storage. When the DPU obtains the notification from the backup manager of the backup storage and confirms that the notification includes a message that all video data chunks associated with a video stream are in archival storage, the DPU may determine that a notification that all video data chunks are in archival storage is obtained from the backup storage. The notification may include a video stream identifier and storage locations for each video data chunk associated with the notification. A determination may be made as to whether all video data chunks are in archival storage via other and/or additional methods without departing from the invention.

In one embodiment of the invention, the backup manager of the backup storage may send a notification that a video data chunk was de-staged to a different storage. The DPU may update the retention and staging metadata to indicate that the video data chunk was de-staged to the different storage. The DPU may monitor the retention and staging metadata to determine when all video data chunks associated with a video stream are stored in archival storage. If the retention and staging metadata indicates that all video data chunks are stored in archival storage, then the DPU may determine that all video data chunks are stored in archival storage. If the retention and staging metadata does not indicate that all video data chunks are stored in archival storage, then the DPU may determine that all video data chunks are not stored in archival storage. A determination may be made as to whether all video data chunks are in archival storage via other and/or additional methods without departing from the invention.

If it is determined that a notification that all video data chunks are in archival storage is obtained from a backup storage, then the method proceeds to step 812. If it is that a notification that all video data chunks are in archival storage is not obtained from a backup storage, then the method proceeds to step 810 (i.e., the DPU waits until the notification is received).

In step 812, the video data chunks are stitched together. The video data chunks may be stored in various storage locations and may be consider by the backup storage manager as individual video data chunks. The DPU may use the retention and staging metadata and/or other metadata (i.e., indexing metadata) to identify all of the video data chunks associated with the video stream identifier included in the retention and staging metadata and/or the other metadata. The DPU may obtain copies of the video data chunks from the backup storage and associate the video data chunks of the video data stream together to generate a video file. The video file may include the video stream identifier and the video data chunks. The DPU may send the video file to the backup storage, which stores the video file in archival storage in a manner such that the video data chunks are stored contiguously. The backup manager of the backup storage may delete the individual video data chunks (not the video data chunks included in the video file) from archival storage. The video data chunks may be stitched together via other and/or additional methods without departing from the invention.

In step 814, a determination is made as to whether the long term retention period has ended. In one or more embodiments of the invention, the DPU uses the retention and staging metadata to determine whether the long term retention period has ended. As discussed above, the retention and staging metadata includes the long term retention period associated with each video data chunk. The DPU may monitor the long term retention periods using a real-time clock, and when the long term retention period matches or is an earlier point in time than the time depicted by the real time clock, the long term retention period has ended. If the long term retention period matches or is an earlier point in time than the time depicted by the real-time clock, then the DPU determines that the long term retention period has ended. If the long term retention period does not match or is a later point in time than the time depicted by the real-time clock, then the DPU determines that the long term retention period has not ended. A determination may be made as to whether the long term retention period has ended via other and/or additional methods without departing from the invention.

If it is determined that the long term retention period has ended, then the method proceeds to step 816. If it is determined that the long term retention period has not ended, then the method proceeds to step 814.

In step 816, the video data chunks are deleted from archival storage. In one or more embodiments of the invention, the DPU initiates the deletion of the video data chunks. The DPU may send a message to the backup storage. The message may include the video data chunk identifiers associated with each of the video data chunks. The message may also include a request to delete the video data chunks associated with the video data chunk identifiers. After obtaining the message, the backup manager of the backup storage may delete the video data chunks associated with the video data chunk identifiers from the archival storage. The video data chunks may be deleted from archival storage via other and/or additional methods without departing from the invention.

The method may end following step 816.

Figure 8B:
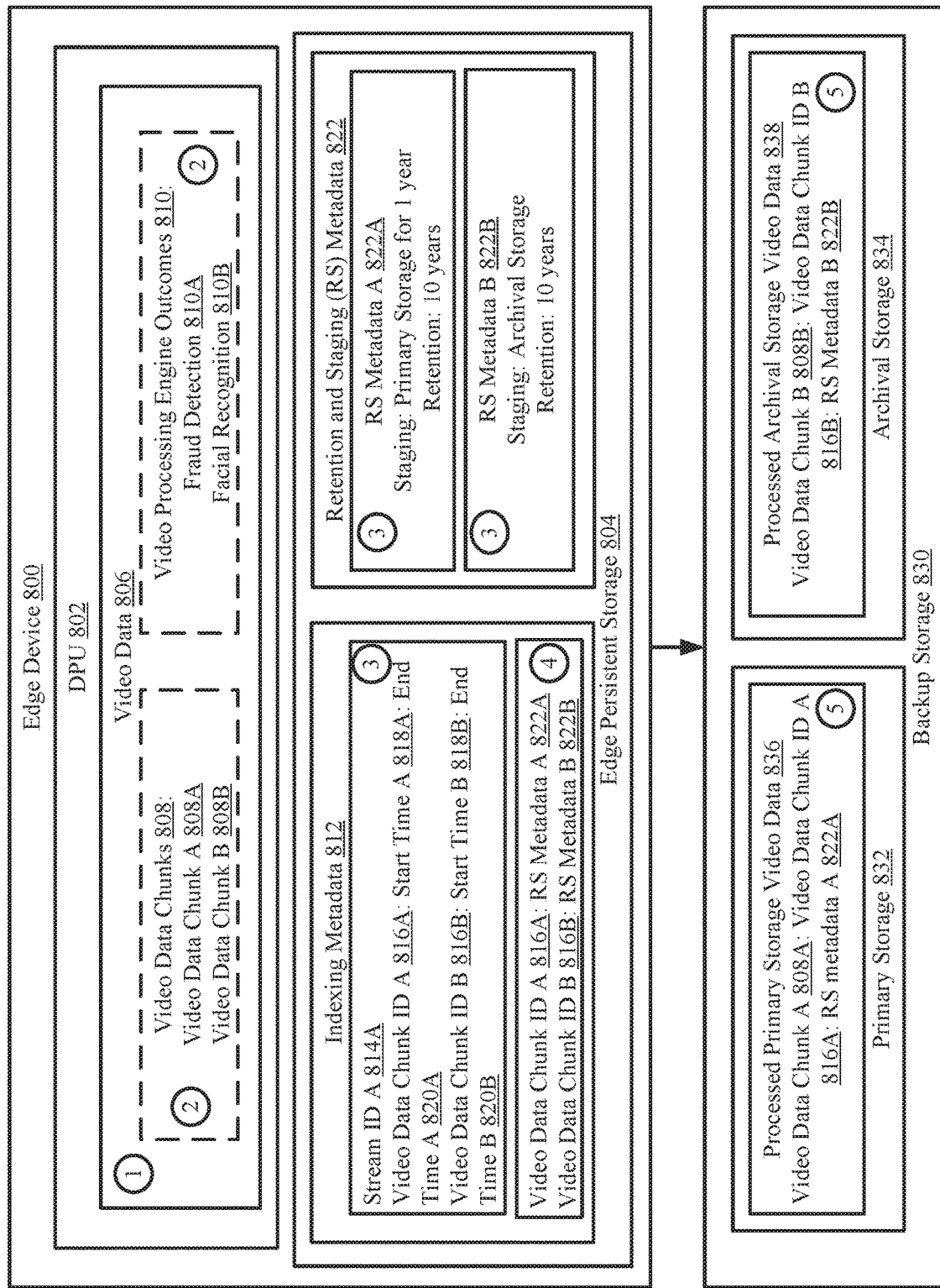
FIGS. 8B-8C show diagrams of a sixth example in accordance with one or more embodiments of the invention.
Figure 8C:
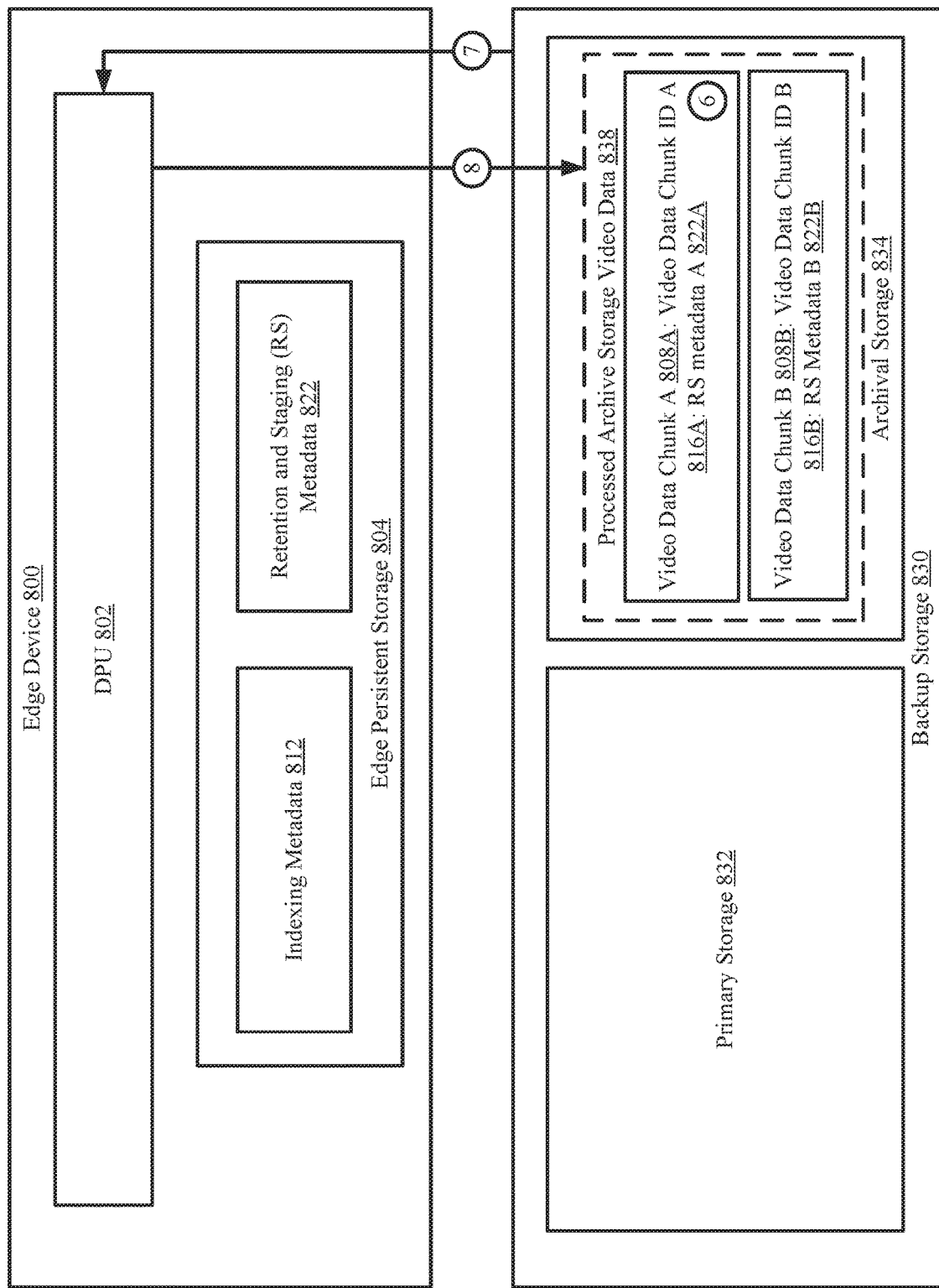

FIGS. 8B-8C show diagrams of a sixth example in accordance with one or more embodiments of the invention. The example depicted in FIGS. 8B-8C may depict a long term stitching operation. The example is not intended to limit the scope of the invention. The example system depicted in FIGS. 8B-8C may include fewer components than the systems depicted in FIGS. 1A-1C for the sake of brevity.

Turning to the example and FIG. 8B, consider a scenario in which a video camera (not shown) provides video data to an edge device (800). The edge device (800) includes a DPU (802) and edge persistent storage (804).

Initially, the DPU (802) obtains video data (806) from a video camera (not shown) [1]. After obtaining the video data (806), the DPU (802) applies the video data to the data analytics models of the video processing engine (not shown) of the DPU (802) to generate video data chunks (808) and video processing engine outcomes (810) [2]. The video data chunks (808) includes video data chunk A (808A) and video data chunk B (808B). The video processing engine outcomes (810) include fraud detection (810A) and facial recognition (810B). Following the generation of the video data chunks (808) and the video processing engine outcomes (810), the DPU (802) generates indexing metadata (812) and retention and staging (RS) metadata (822) based on the video data chunks (808) and the video processing engine outcomes (810) [3]. The indexing metadata (812) includes stream ID A (814A) and information associated with both video data chunks (808A, 808B). The information associated with video data chunk A (808A) includes video data chunk ID A (816A), start time A (818A), and end time A (820A). The information associated with video data chunk B (808B) includes video data chunk ID B (816B) start time B (818B), and end time B (820B). The RS metadata (822) includes RS metadata A (822A) and RS metadata B (822B). RS metadata A (822A) includes the retention period and staging information associated with video data chunk A (808A), in which fraud detection (810A) occurred. The retention period specifies that video data chunk A (808A) may not be deleted for ten years, and the staging information specifies that video data chunk A (808A) is to be stored in a primary storage and then de-staged after a year. RS metadata B (822B) includes the retention period and staging information associated with video data chunk B (808B), in which facial recognition (810B) occurred. The retention period specifies that video data chunk B (808B) may not be deleted for ten years, and the staging information specifies that video data chunk B (808B) is to be stored in an archival storage.

Then, the DPU (802) associates the indexing metadata (812) and the RS metadata (822) with the video data chunks (808) by associating the video data chunk IDs (816A, 816B) with each RS metadata (822A, 822B) [4]. In this example, fraud detection (810A), which is associated with RS metadata A (822A), occurs in video data chunk A (808A). Therefore, video data chunk ID A (816A) is associated with RS metadata A (822A). Facial recognition (810B), which is associated with RS metadata B (822B), occurs in video data chunk B (808B). Therefore, RS metadata B (822B) is associated with video data chunk ID B (816B). Finally, the DPU (802) sends the video data chunks (808A, 808B) and copies of portions of the indexing metadata (812) and RS metadata (822) to the backup storage (830). Video data chunk A (808A) and the indexing metadata (812) and RS metadata (822) associated with video data chunk A (808A) are stored in primary storage (832) as processed primary storage video data (836) based on RS metadata A (822A). The processed primary storage video data (834) includes video data chunk A (808A), video data chunk ID A (816A), and RS metadata A (822A). Video data chunk B (808B) and the indexing metadata (812) and RS metadata (822) associated with video data chunk B (808B) are stored in archival storage (834) as processed archival storage video data (838) based on RS metadata B (822B). The processed archival storage video data (838) includes video data chunk B (808B), video data chunk ID B (816B), and RS metadata B (822B).

Turning to FIG. 8C, after a year, the backup storage (830) de-stages video data chunk A (808A) from primary storage (832) to archival storage (834) [6]. As a result, the processed archive storage video data (838) now includes video data chunk A (808A), video data chunk ID A (816A), and RS metadata A (822A). After video data chunk A (808A) is de-staged from primary storage (832) to archival storage (834), the backup storage (830) sends a notification to the DPU (802) that all video data chunks associated with stream ID A (814A) are stored in archival storage [7]. In response to obtaining the notification from the backup storage (830), the DPU stitches together video data chunk A (808A) and video data chunk B (808B) [8]. As a result, video data chunk A (808A) and video data chunk B (808B) are represented in the archival storage (834) as a single video stream (represented by the dashed line depicted in FIG. 8C.

Figure 9A:
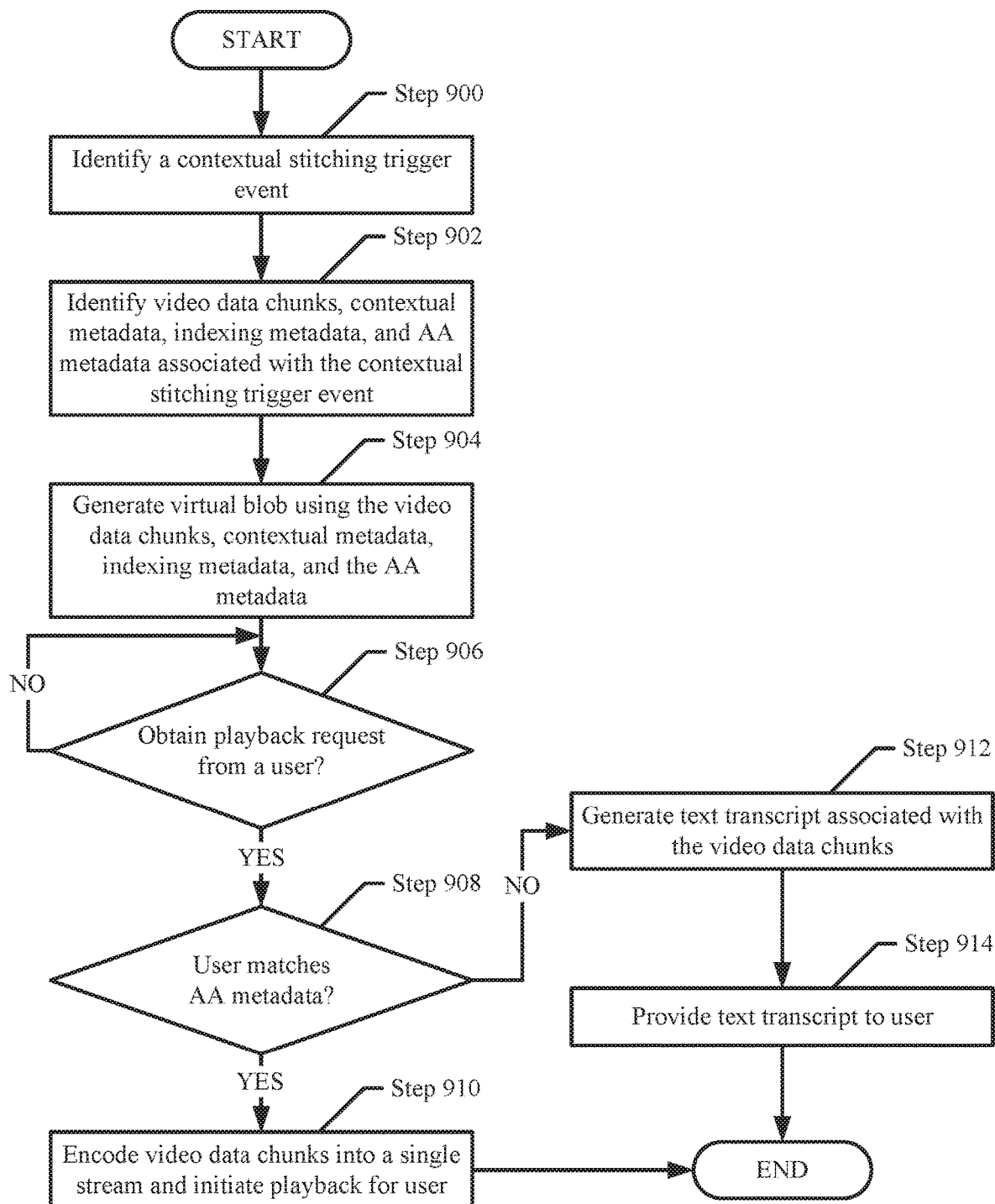
FIG. 9A shows a flowchart of a method for performing a contextual stitching operation on video data in accordance with one or more embodiments of the invention.

FIG. 9A shows a flowchart of a method for performing a contextual stitching operation in accordance with one or more embodiments of the invention. The method shown in FIG. 9A may be performed by, for example, a DPU (e.g., 104, FIG. 1B) of an edge device. Other components of the system illustrated in FIG. 1A may perform all, or a portion, of the method of FIG. 9A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

Turning to FIG. 9A, in step 900, a contextual stitching trigger event is identified. In one or more embodiments of the invention, the DPU identifies an anomaly as a contextual trigger event. As discussed above, during processing of video data, the DPU applies data analytics model(s) to video data. The data analytics model(s) may generate video processing engine outcomes associated with anomalies. For example, a video processing engine outcome may be detection of a fraudulent activity, security breach, and other and/or additional types of anomalies without departing from the invention. The DPU may identify the aforementioned video processing engine outcomes that result in detections of anomalies as contextual trigger events. The DPU may identify one or more indexing attributes associated with the contextual trigger events. A contextual stitching trigger event may be identified via other and/or additional methods without departing from the invention.

In one or more embodiments of the invention, a contextual trigger event is obtained from a user of the system. A user of the system may send a message to the DPU. The message may include a request for contextual stitching of video data chunks. The message may include one or more indexing attributes associated with the request. The DPU may identify these requests from users as contextual stitching trigger events. A contextual trigger event may be identified via other and/or additional methods without departing from the invention.

In step 902, video data chunks, contextual metadata, indexing metadata, and AA metadata associated with the contextual stitching trigger event are identified. In one or more embodiments of the invention, the DPU uses the indexing attribute(s) included in or identified in the contextual stitching trigger event to identify video data chunks, contextual metadata, indexing metadata, and AA metadata associated with the contextual stitching trigger event. As discussed above, indexing attributes may specify information regarding of video data chunk contents such as a person, date and time, location, and other and/or additional information regarding video data chunk contents without departing from the invention. The DPU may search the video stream metadata entries stored in edge persistent storage for indexing metadata associated with the indexing attribute(s) associated with the contextual stitching trigger event. The DPU may identify indexing metadata associated with the indexing attribute of the contextual trigger event. The DPU may obtain the identified indexing metadata, and the contextual metadata and AA metadata associated with the identified indexing metadata from edge persistent storage. The DPU may identify and obtain video data chunks associated with the identified indexing metadata from the backup storage(s). Video data chunks, contextual metadata, indexing metadata, and AA metadata associated with the contextual stitching trigger event may be identified via other and/or additional methods without departing from the invention.

In one or more embodiments of the invention, the DPU sends messages to other DPUs of other edge devices to identify and obtain video data chunks, indexing metadata, contextual metadata, and AA metadata associated with the contextual trigger event. All, and or a portion, of the video data chunks, indexing metadata, contextual metadata, and/or AA metadata associated with the contextual stitching trigger event may be stored in other DPUs and/or backup storages. The messages may include the indexing attribute(s) associated with the contextual stitching trigger event and a request for video data chunks, indexing metadata, contextual metadata, and AA metadata associated with the indexing attribute (s). In response to obtaining the requests, the DPUs may identify and obtain all, or a portion, of the indexing metadata, contextual metadata, AA metadata, and the video data chunks associated with the indexing attribute(s) via methods discussed above and send the identified indexing metadata, contextual metadata, AA metadata, and video data chunks to the DPU that identified the contextual trigger event. Video data chunks, indexing metadata, contextual metadata, and AA metadata associated with the contextual trigger event may be identified via other and/or additional methods without departing from the invention.

In step 904, a virtual blob is generated using the video data chunks, contextual metadata, indexing metadata and the AA metadata. In one or more embodiments of the invention, DPU uses the virtual blob generator along with the video data chunks, contextual metadata, indexing metadata, and the AA metadata to generate a virtual blob. The virtual blob generator may generate a virtual blob file as discussed above. The virtual blob file may include the AA metadata, contextual metadata, and indexing metadata associated with the video data chunks. The virtual blob file may be used to stitch together the video data chunks and to verify a user's authentication and authorization information. The DPU may include an expiration timestamp in the virtual blob file and store the virtual blob in edge volatile storage of the edge device. A virtual blob may be generated using the video data chunks, contextual metadata, indexing metadata, and the AA metadata via other and/or additional methods without departing from the invention.

In step 906, a determination is made as to whether a playback request is obtained from a user. In one or more embodiments of the invention, the user of the system sends a message to the DPU. The message may include a playback request associated with the virtual blob. The message may include the indexing attribute(s), and/or other indexing metadata that may be used by the DPU to identify the virtual blob associated with the playback request. The message may also include authentication and authorization information associated with the user. If the DPU obtains a message that includes a playback request associated with the virtual blob, then the DPU may determine that a playback request is obtained from a user. If the DPU does not obtain a message that includes a playback request associated with the virtual blob, then the DPU may determine that a playback request is not obtained from a user. The DPU may wait for a playback request until the expiration timestamp included in the virtual blob is exceeded. In such a scenario, the DPU may delete the virtual blob from edge volatile storage. A determination may be made as to whether a playback request is obtained from a user via other and/or additional methods without departing from the invention.

If it is determined that a playback request is obtained from a user, then the method proceeds to step 908. If it is determined that a playback request is not obtained from a user, then the method proceeds to step 906 (i.e., the DPU waits until a playback request is received).

In step 908, a determination is made as to whether the user matches the AA metadata. In one or more embodiments of the invention, the DPU compares the users authentication and authorization information with the AA metadata included in the virtual blob. The user authentication and authorization information may include a user identifier and/or a group identifier. The DPU may compare the user identifier and/or group identifier included in the user authentication and authorization information with the user identifier and/or group identifier included in the AA metadata in the virtual blob. If the user identifiers and/or group identifiers match, then the DPU may determine that the user matches the AA metadata. If the user identifiers and/or group identifiers do not match, then the DPU may determine that the user does not match the AA metadata. A determination may be made as to whether the user matches the AA metadata via other and/or additional methods without departing from the invention.

If it is determined that the user matches the AA metadata, then the method proceeds to step 910. If it is determined that the user does not match the AA metadata, then the method proceeds to step 912.

In step 910, the video data chunks are encoded into a single stream and playback is initiated for the user. In one or more embodiments of the invention, the DPU uses the virtual blob to encode the video data chunks into a single stream. The DPU may generate a video file and includes all the video data chunks using the indexing metadata and contextual metadata included in the virtual blob. The video file may be played by the user. The DPU may send the video file and a message that includes a request to initiate playback of the video file to the user. The video data chunks may be encoded into a single stream and playback may be initiated for the user. The video data chunks may be encoded into a single stream and playback may be initiated via other and/or additional methods without departing from the invention.

The method may end following step 910.

In step 912, a text transcript associated with the video data chunks is generated. In one or more embodiments of the invention, the DPU uses the context generator to generate a text transcript associated with the video data chunks. The DPU may apply the context generation model(s) included in the context generator to the contextual metadata and video data chunks. The context generation model(s) may generate a text transcript associated with the video data chunks. The text transcript may be a text file that includes a textual summary of the video data chunks. A text transcript associated with the video data chunks may be generated via other and/or additional methods without departing from the invention.

In step 914, the text transcript is provided to the user. In one or more embodiments of the invention, the DPU sends a message to the user. The message may include the text transcript associated with the video data chunks. The text transcript may be provided to the user via other and/or additional methods without departing from the invention.

The method may end following step 914.

Figure 9B:
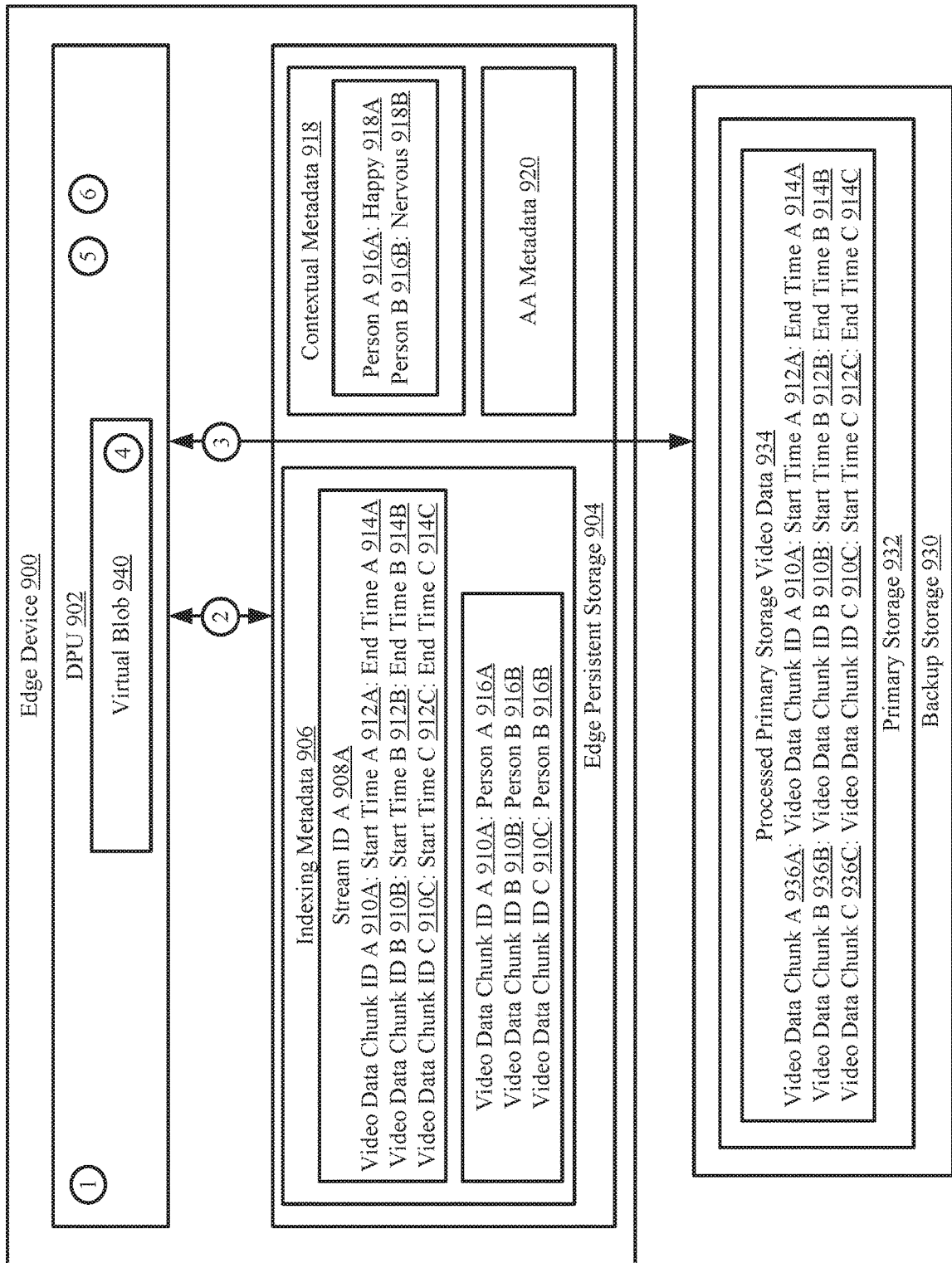
FIG. 9B shows a diagram of a seventh example in accordance with one or more embodiments of the invention.

FIG. 9B shows a diagram of a seventh example in accordance with one or more embodiments of the invention. The example depicted in FIG. 9B may depict a contextual stitching operation. The example is not intended to limit the scope of the invention. The example system depicted in FIG. 9B may include fewer components than the systems depicted in FIGS. 1A-1C for the sake of brevity.

Turning to the example and FIG. 9B, consider a scenario in which a user (not shown) requests for video data from an edge device (900). The edge device (900) includes a DPU (902) and edge persistent storage (904).

Initially, the DPU (902) obtains a request for video data from a user (not shown) of the system. The request may be a request for video data chunks associated with person B (916B). The DPU (902) identifies the request as a contextual stitching trigger event [1]. After identifying the contextual stitching trigger event, the DPU (902) identifies and obtains indexing metadata (906), contextual metadata (918) (which includes person A (916A) as happy (918A) and person B (916B) as nervous (918B)), and AA metadata (920) associated with the contextual stitching trigger event [2]. The indexing metadata (906) includes stream ID A (908A) and information associated with the video data chunks (936A, 936B, 936C). The information associated with video data chunk A (936A) includes video data chunk ID A (910A), start time A (912A), and end time A (914A). The information associated with video data chunk B (936B) includes video data chunk ID B (910B) start time B (912B), and end time B (914B). The information associated with video data chunk C (936C) includes video data chunk ID C (910C) start time C (912C), and end time C (914C). The indexing metadata (906) obtained by the DPU (902) only includes indexing information associated with video data chunk B (936B) and video data chunk C (936C) since person B (916B) is associated with video data chunk B (936B) and video data chunk C (936C).

The DPU (902) then identifies and obtains video data chunk B (936B) and video data chunk C (936C) stored in primary storage (932) of the backup storage (930) as processed primary storage video data (934) [3]. The processed primary storage video data (934) includes video data chunk A (936A), video data chunk ID A (910A), start time A (912A), end time A (914A), video data chunk B (936B), video data chunk ID B (910B) start time B (912B), end time B (914B), video data chunk C (936C), video data chunk ID C (910C) start time C (912C), and end time C (914C). The DPU (902) then generates a virtual blob (940) using video data chunk B (936B), video data chunk C (936C), indexing metadata (906), contextual metadata (918), and AA metadata (920) [4]. After generating the virtual blob (940), the DPU (902) obtains a playback request, and determines that the user authentication and authorization information included in the playback request matches the AA metadata (918) included in the virtual blob (940) [5]. In response to the determination, the DPU (902) encodes video data chunk B (936B) and video data chunk C (936C) into a single video file and provides the video file to the user [6].

Figure 10A:
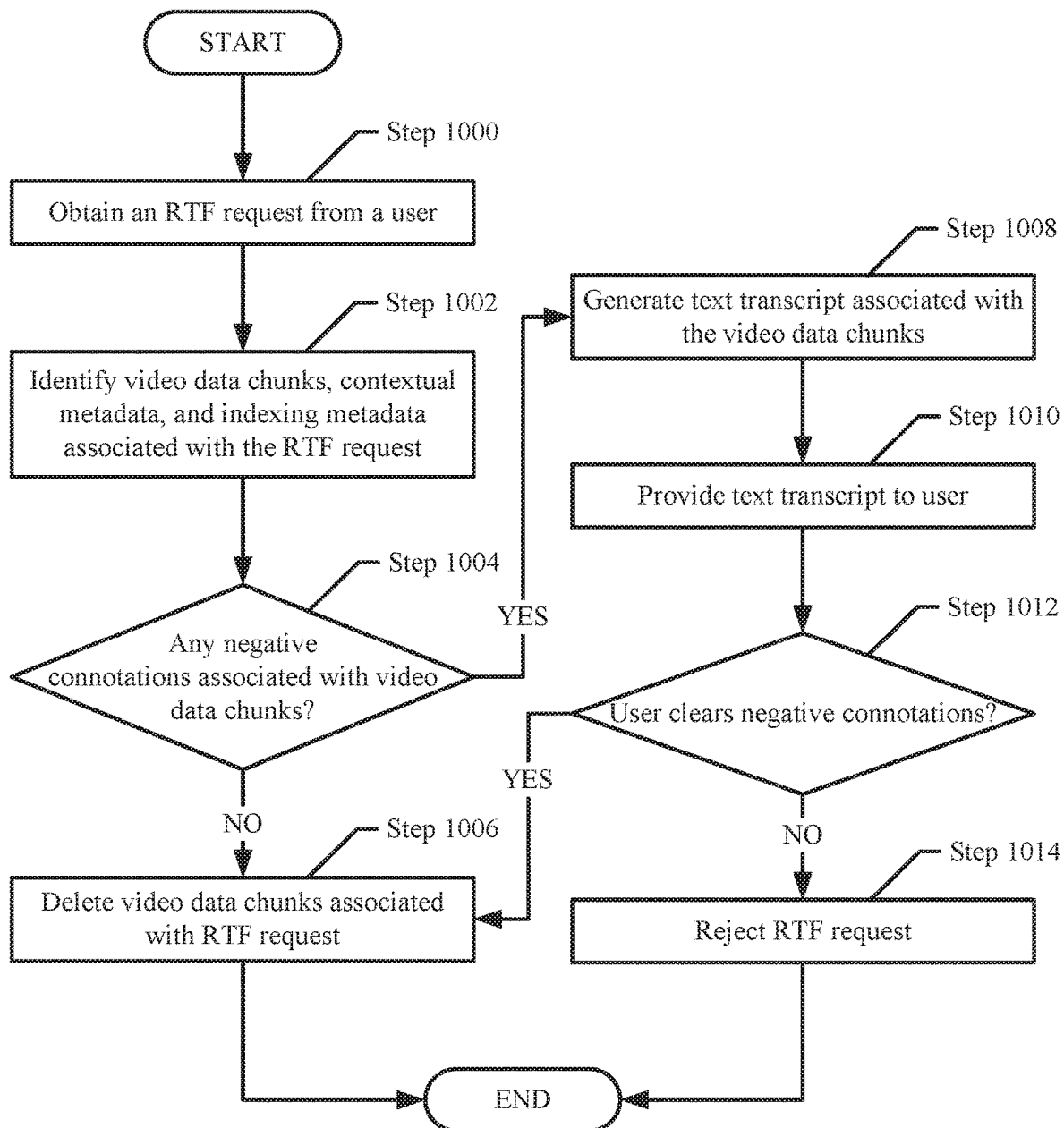
FIG. 10A shows a flowchart of a method for performing a right to be forgotten operation on video data in accordance with one or more embodiments of the invention.

FIG. 10A shows a flowchart of a method for performing a right to be forgotten operation in accordance with one or more embodiments of the invention. The method shown in FIG. 10A may be performed by, for example, a DPU (e.g., 104, FIG. 1B) of an edge device. Other components of the system illustrated in FIG. 1A may perform all, or a portion, of the method of FIG. 10A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

Turning to FIG. 10A, in step 1000, an RTF request is obtained from a user. In one or more embodiments of the invention, a user of the system may send a message to the DPU. The message may include a RTF request. The message may also include one or more indexing attributes (i.e., one or more people) associated with the RTF request. An RTF request may be obtained via other and/or additional methods without departing from the invention.

In step 1002, video data chunks, contextual metadata, and indexing metadata associated with the RTF request are identified. In one or more embodiments of the invention, the DPU uses the indexing attribute(s) included in the RTF request to identify video data chunks, contextual metadata, and indexing metadata associated with the RTF request. As discussed above, indexing attributes may specify information regarding of video data chunk contents, such as a person. The DPU may search the video stream metadata entries stored in edge persistent storage for indexing metadata associated with the indexing attribute(s) associated with the RTF request. The DPU may identify indexing metadata associated with the indexing attribute(s). The DPU may obtain the identified indexing metadata, and the contextual metadata associated with the identified indexing metadata from edge persistent storage. The DPU may identify and obtain video data chunks associated with the identified indexing metadata from the backup storage(s). Video data chunks, contextual metadata, and indexing metadata associated with the RTF request may be identified via other and/or additional methods without departing from the invention.

In one or more embodiments of the invention, the DPU sends messages to other DPUs of other edge devices to identify and obtain video data chunks, indexing metadata, and contextual metadata, and with the RTF request. All, and or a portion, of the video data chunks, indexing metadata, and/or contextual metadata associated with the RTF request may be stored in other DPUs and/or backup storages. The messages may include the indexing attribute(s) associated with the RTF request and a request for video data chunks, indexing metadata, and contextual metadata associated with the indexing attribute(s). In response to obtaining the requests, the DPUs may identify and obtain all, or a portion, of the indexing metadata, contextual metadata, and the video data chunks associated with the indexing attribute(s) via the methods discussed above and send the identified indexing metadata, contextual metadata, and video data chunks to the DPU that obtained the RTF request. Video data chunks, indexing metadata, and contextual metadata associated with the RTF request may be identified via other and/or additional methods without departing from the invention.

In step 1004, a determination is made as to whether any negative connotations are associated with the video data chunks. In one or more embodiments of the invention, the DPU identifies contextual metadata and applies the data analytics model(s) of the video processing engine to the video data chunks to obtain video processing engines to generate video processing engine outcomes to determine if the video data chunks are associated with any negative connotations. The contextual metadata may include contextual attributes that depict negative characteristics of people included in video data chunks (e.g., nervous, false pretense made, etc.). The video processing engine outcomes may include negative video processing engine outcomes such as fraud detection, security breach, and any other negative video processing engine outcomes without departing from the invention. If the video processing engine outcomes and/or contextual metadata are associated with negative connotations, then the DPU may determine that negative connotations are associated with the video data chunks. If the video processing engine outcomes and contextual metadata are not associated with any negative connotations, then the DPU may determine that no negative connotations are associated with the video data chunks.

If it is determined that negative connotations are associated with the video data chunks, then the method proceeds to step 1008. If it is determined that no negative connotations are associated with the video data chunks, then the method proceeds to step 1006.

In step 1006, the video data chunks associated with the RTF request are deleted. In one or more embodiments of the invention, the DPU deletes the video data chunks from edge storage and the backup storage(s). The DPU may identify the video data chunks associated with the RTF request using the indexing metadata associated with the video data chunks and the indexing attribute(s) included in the RTF request. The DPU may send a message to the backup storage(s) to delete all video data chunks associated with the RTF request. In response to obtaining the request, the backup storage(s) may delete the video data chunks. The video data chunks may be deleted via other and/or additional methods without departing from the invention.

The method may end following step 1006.

In step 1008, a text transcript associated with the video data chunks is generated. In one or more embodiments of the invention, the DPU uses the context generator to generate a text transcript associated with the video data chunks. The DPU may apply the context generation model(s) included in the context generator to the contextual metadata and video data chunks. The context generation model(s) may generate a text transcript associated with the video data chunks. The text transcript may be a text file that includes a textual summary of the video data chunks. A text transcript associated with the video data chunks may be generated via other and/or additional methods without departing from the invention.

In step 1010, the text transcript is provided to the user. In one or more embodiments of the invention, the DPU sends a message to the user. The message may include the text transcript. The text transcript may be provided to the user via other and/or additional methods without departing from the invention.

In step 1012, a determination is made as to whether the user clears the negative connotations associated with the video data chunks. In one or more embodiments of the invention, the user sends a message to the DPU that indicates whether the negative connotations are cleared. The message may include a flag, or a special bit, that when set, indicates that the negative connotations are cleared. If the flag is set, the DPU may determine that the user clears the negative connotations associated with the video data chunks.

If the flag is not set, the user may determine that the user does not clear the negative connotations associated with the video data chunks. A determination may be made as to whether the user clears the negative connotations associated with the video data chunks via other and/or additional methods without departing from the invention.

In step 1014, the RTF request is rejected. In one or more embodiments of the invention, the DPU sends a message to the user. The message may include a notification that the RTF request is rejected. As a result, the DPU may not delete the video data chunks associated with the RTF request. The RTF request may be rejected via other and/or additional methods without departing from the invention.

The method may end following step 1014.

Figure 10B:
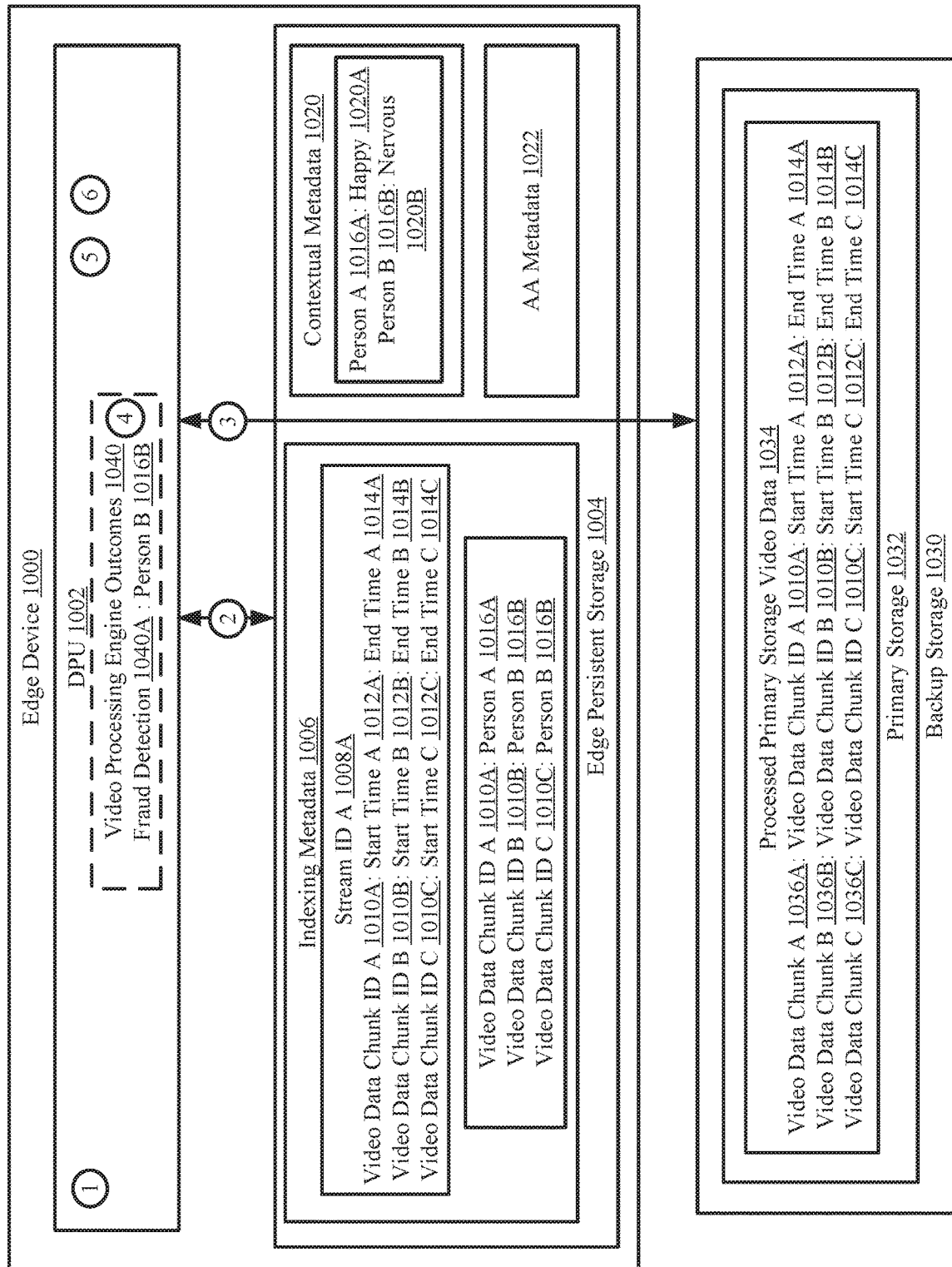
FIG. 10B shows a diagram of an eighth example in accordance with one or more embodiments of the invention.

FIG. 10B shows a diagram of an eighth example in accordance with one or more embodiments of the invention. The example depicted in FIG. 10B may depict a RTF operation. The example is not intended to limit the scope of the invention. The example system depicted in FIG. 10B may include fewer components than the systems depicted in FIGS. 1A-1C for the sake of brevity.

Turning to the example and FIG. 10B, consider a scenario in which a user (not shown) requests for video data associated with a RTF request be deleted from an edge device (1000). The edge device (1000) includes a DPU (1002) and edge persistent storage (1004).

Initially, the DPU (1002) obtains an RTF request from a user (not shown) of the system [1]. The RTF request may be a request for video data chunks associated with person B (1016B). After obtaining the RTF request, the DPU (1002) identifies and obtains indexing metadata (1006) and contextual metadata (1020) (which includes person A (1016A) as happy (1020A) and person B (1016B) as nervous (1020B)) [2]. The indexing metadata (1006) includes stream ID A (1008A) and information associated with the video data chunks (1036A, 1036B, 1036C). The information associated with video data chunk A (1036A) includes video data chunk ID A (1010A), start time A (1012A), and end time A (1014A). The information associated with video data chunk B (1036B) includes video data chunk ID B (1010B) start time B (1012B), and end time B (1014B). The information associated with video data chunk C (1036C) includes video data chunk ID C (1010C) start time C (1012C), and end time C (1014C). The indexing metadata (1006) obtained by the DPU (1002) only includes indexing information associated with video data chunk B (1036B) and video data chunk C (1036C) as person B (1016B) is associated with video data chunk B (1036B) and video data chunk C (1036C).

The DPU (1002) then identifies and obtains video data chunk B (1036B) and video data chunk C (1036C) stored in primary storage (1032) of the backup storage (1030) as processed primary storage video data (1034) [3]. The processed primary storage video data (1034) includes video data chunk A (1036A), video data chunk ID A (1010A), start time A (1012A), end time A (1014A), video data chunk B (1036B), video data chunk IDB (1010B), start time B (1012B), end time B (1014B), video data chunk C (1036C), video data chunk ID C (1010C), start time C (1012C), and end time C (1014C). After obtaining video data chunk B (1036B) and video data chunk C (1036C), the DPU (1002) applies video data chunks B (1036B) and video data chunk C (1036C) to the data analytics model(s) of the video processing engine and obtains a video processing engine outcome (1040). The video processing engine outcome is fraud detection (1040A), which is associated with person B (1016B). The DPU (1002) determines that there is negative connotations associated with video data chunk B (1036B)

and video data chunk C (1036C) due to the fraud detection (1040A) [4]. The DPU (1002) generates a text transcript associated with video data chunk B (1036B) and video data chunk C (1036C) and provides the text transcript to the user. The user does not clear the negative connotations [5]. The DPU (1002) rejects the RTF request and does not delete video data chunk B (1036B) and video data chunk C (1036C) [6].

As discussed above, embodiments of the invention may be implemented using computing devices. FIG. 11 shows a diagram of a computing device in accordance with one or more embodiments of the invention. The computing device (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), input devices (1110), output devices (1108), and numerous other elements (not shown) and functionalities. Each of these components is described below.

In one embodiment of the invention, the computer processor(s) (1102) may be an integrated circuit for processing instructions. For example, the computer processor(s) may be one or more cores or micro-cores of a processor. The computing device (1100) may also include one or more input devices (1110), such as a touchscreen, keyboard, mouse, microphone, touchpad, electronic pen, or any other type of input device. Further, the communication interface (1112) may include an integrated circuit for connecting the computing device (1100) to a network (not shown) (e.g., a local area network (LAN), a wide area network (WAN) such as the Internet, mobile network, or any other type of network) and/or to another device, such as another computing device.

In one embodiment of the invention, the computing device (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating indexing metadata and contextual metadata through indexing operations and contextual operations when initially processing video data by a DPU of an edge device. Further, in various embodiments of the invention, indexing metadata and contextual metadata include information regarding video data content that may be used to efficiently search for video data chunks stored in the system.

In traditional systems, searching for specific video data stored in the system may be extremely difficult. In systems with a large amounts of video data, the process of identifying and obtaining video data chunks for playback may be complex and require a significant amount of time and computational resources. Embodiments of the invention improve the efficiency of processing and searching for video data stored in the system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing video data, the method comprising:
 obtaining, by a data processing unit (DPU) of an edge device, video data;
 processing the video data to obtain video data chunks and indexing attributes;
 generating indexing metadata based on the video data chunks and the indexing attributes;
 processing the video data chunks and indexing attributes to generate contextual attributes;
 generating contextual metadata based on the contextual attributes and the video data chunks;
 associating the indexing metadata and the contextual metadata with the video data chunks; and
 storing the indexing metadata, contextual metadata, and the video data chunks in storage.

2. The method of claim 1, wherein the video data comprises at least one selected from a group consisted of:
 video data obtained from a video camera; and
 video data stored in a backup storage.

3. The method of claim 2, wherein the video camera is connected to the edge device with a local connection and the backup storage is connected to the edge device with a non-local connection.

4. The method of claim 1, wherein storing the indexing metadata, contextual metadata, and the video data chunks comprises:
 storing the indexing metadata and the contextual metadata in persistent storage of the edge device; and
 storing the video data chunks and copies of the indexing metadata and contextual metadata in a backup storage.

5. The method of claim 1, further comprising:
 following the storing of the indexing metadata, contextual metadata, and the video data chunks in storage:
  obtaining, by the DPU, a video search request from a user, wherein the video search request specifies an indexing attribute of the indexing attributes;
  identifying the indexing metadata associated with the indexing attribute; and
  obtaining, from a backup storage, the video data chunks based on the indexing metadata.

6. The method of claim 1, wherein processing the video data comprises applying at least one data analytics models to the video data.

7. The method of claim 6, wherein the at least one data analytics model generates the video data chunks, the indexing attributes, and the contextual attributes.

8. A system for processing video data, comprising:
a backup storage operatively connected to an edge device;
a video camera operatively connected to the edge device and configured to generate video data;
the edge device comprising a data processing unit (DPU), wherein the DPU is configured to perform a method, the method comprising:
obtaining the video data;
processing the video data to obtain video data chunks and indexing attributes;
generating indexing metadata based on the video data chunks and the indexing attributes;
processing the video data chunks and indexing attributes to generate contextual attributes;
generating contextual metadata based on the contextual attributes and the video data chunks;
associating the indexing metadata and the contextual metadata with the video data chunks; and
storing the indexing metadata, contextual metadata, and the video data chunks in the backup storage.

9. The system of claim 8, wherein obtaining the video data comprises obtaining the video data obtained from the video camera.

10. The system of claim 8, wherein obtaining the video data comprises obtaining the video data stored in the backup storage.

11. The system of claim 8, wherein the video camera is operatively connected to the edge device with a local connection and the backup storage is operatively connected to the edge device with a non-local connection.

12. The system of claim 11, wherein the local connection is a local wireless connection.

13. The system of claim 11, wherein the local connection is a local wired connection.

14. The system of claim 11, wherein the non-local connection is a network connection over a wide area network.

15. A non-transitory computer readable medium comprising computer readable program code, which when executed by a computer processor enables the computer processor to perform a method for processing video data, the method comprising:

obtaining, by a data processing unit (DPU) of an edge device, video data;
processing the video data to obtain video data chunks and indexing attributes;
generating indexing metadata based on the video data chunks and the indexing attributes;
processing the video data chunks and indexing attributes to generate contextual attributes;
generating contextual metadata based on the contextual attributes and the video data chunks;
associating the indexing metadata and the contextual metadata with the video data chunks; and
storing the indexing metadata, contextual metadata, and the video data chunks in storage.

16. The non-transitory computer readable medium of claim 15, wherein the video data comprises at least one selected from a group consisted of:
video data obtained from a video camera; and
video data stored in a backup storage.

17. The non-transitory computer readable medium of claim 16, wherein the video camera is connected to the edge device with a local connection and the backup storage is connected to the edge device with a non-local connection.

18. The non-transitory computer readable medium of claim 15, wherein storing the indexing metadata, contextual metadata, and the video data chunks comprises:
storing the indexing metadata and the contextual metadata in persistent storage of the edge device; and
storing the video data chunks and copies of the indexing metadata and contextual metadata in a backup storage.

19. The non-transitory computer readable medium of claim 15, wherein the method further comprising: following the storing of the indexing metadata, contextual metadata, and the video data chunks in storage:
obtaining, by the DPU, a video search request from a user, wherein the video search request specifies an indexing attribute of the indexing attributes;
identifying the indexing metadata associated with the indexing attribute; and
obtaining, from a backup storage, the video data chunks based on the indexing metadata.

20. The non-transitory computer readable medium of claim 15, wherein processing the video data comprises applying at least one data analytics models to the video data.

* * * * *